United States Patent
Liaghati

(10) Patent No.: US 12,099,880 B2
(45) Date of Patent: Sep. 24, 2024

(54) ASYMMETRIC TELEMETRY SELECTOR

(71) Applicant: The Boeing Company, Chicago, IL (US)

(72) Inventor: Amir Leon Liaghati, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 576 days.

(21) Appl. No.: 17/493,996

(22) Filed: Oct. 5, 2021

(65) Prior Publication Data

US 2022/0229703 A1  Jul. 21, 2022

Related U.S. Application Data

(60) Provisional application No. 63/139,420, filed on Jan. 20, 2021.

(51) Int. Cl.
  *G06F 9/50*   (2006.01)
  *G06F 11/30*  (2006.01)
  *G06F 11/32*  (2006.01)
  *G06F 11/34*  (2006.01)

(52) U.S. Cl.
  CPC .......... *G06F 9/5044* (2013.01); *G06F 9/5022* (2013.01); *G06F 11/3089* (2013.01); *G06F 11/323* (2013.01); *G06F 11/3466* (2013.01)

(58) Field of Classification Search
  None
  See application file for complete search history.

(56) References Cited

U.S. PATENT DOCUMENTS

| | | | |
|---|---|---|---|
| 9,871,608 | B1 | 1/2018 | Chang et al. |
| 10,003,982 | B2 | 6/2018 | Chang et al. |
| 2012/0079336 | A1* | 3/2012 | Bergman ......... H04W 28/0205 714/748 |
| 2017/0324537 | A1 | 11/2017 | Liaghati et al. |
| 2021/0250298 | A1 | 8/2021 | Liaghati et al. |
| 2022/0209861 | A1* | 6/2022 | Baer ................. H04B 7/212 |

* cited by examiner

*Primary Examiner* — Charles E Anya
(74) *Attorney, Agent, or Firm* — Bell & Manning, LLC

(57) ABSTRACT

A system selects a telemetry allocation for the transmission of data from multiple transmitters. An allocation matrix defines a split ratio for data generated by a data source that is split between transmitters. The split ratio is defined for each data source of a plurality of data sources. (A) A storage buffer model is executed based on the allocation matrix to simulate a buffer that stores data from each data source that exceeds a download bandwidth value. (B) Performance parameter values are stored in association with the allocation matrix. (C) The allocation matrix is updated to redefine at least one split ratio. (D) (A) through (C) is repeated with the allocation matrix replaced with the updated allocation matrix until each unique permutation of values for the split ratio is processed. An allocation matrix is selected from allocation matrices stored in (B) based on the plurality of performance parameter values.

20 Claims, 20 Drawing Sheets

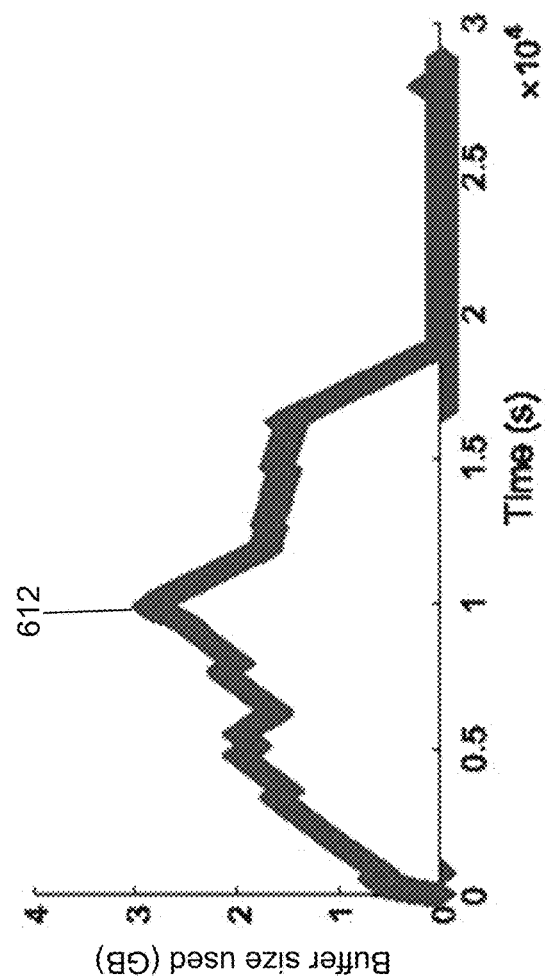
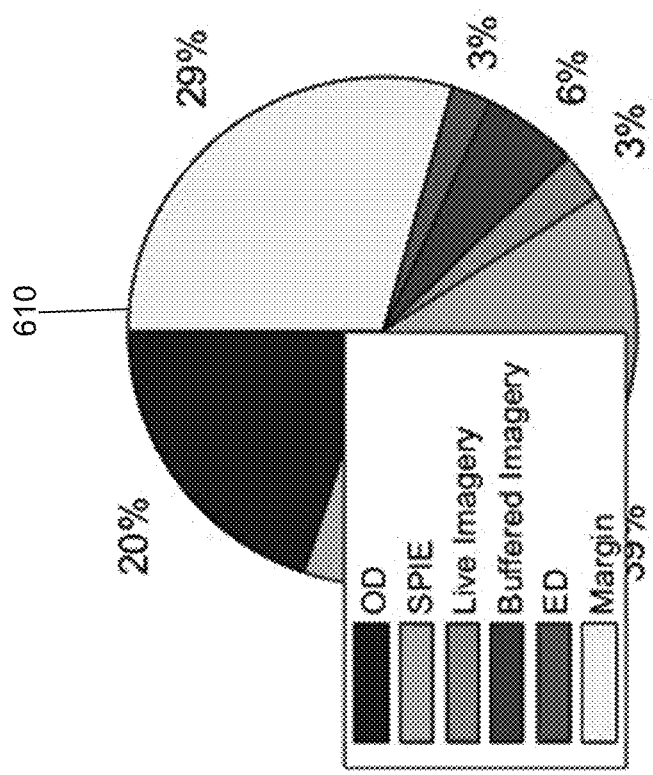
FIG. 6B

ASYMMETRIC TELEMETRY SELECTOR

CROSS-REFERENCE TO RELATED APPLICATIONS

The present application claims the benefit of and priority under 35 U.S.C. § 119(e) to U.S. Provisional Patent Application No. 63/139,420 that was filed Jan. 20, 2021, the entire contents of which are incorporated by reference.

REFERENCE TO GOVERNMENT RIGHTS

This invention was made with Government support under NNM07AB03C awarded by National Aeronautics and Space Administration. The Government has certain rights in this invention.

BACKGROUND

Data may be gathered from sensors mounted on various components of a device to monitor a performance of the device in real time. The data may be transmitted from the monitored device to a second device tasked with monitoring the performance and for further analysis of the data after receipt by the second device. However, an available bandwidth may limit the amount of data transmitted in real time, which may limit the analytic power of the data. For example, though a higher data sampling rate may be desired from one or more of the sensors to simulate a rocket flight, the limited bandwidth may limit the ability to transmit the higher amount of data that results from the higher data sampling rate to the second device. When there are a plurality of transmitters, possibly with different transmission characteristics, that can be used to transmit the data, many possible telemetry allocations exist for how to most efficiently transmit the data from the monitored device to the second device.

SUMMARY

In an example embodiment, a computer-readable medium is provided having stored thereon computer-readable instructions that when executed by a processor, cause a controller to select a telemetry allocation for the transmission of data from multiple transmitters. An allocation matrix is initialized. The allocation matrix defines a split ratio for data generated by a data source that is split between a plurality of transmitters. The split ratio is defined for each data source of a plurality of data sources. (A) A storage buffer model that simulates a buffer usage history as a function of time is executed for each transmitter of the plurality of transmitters based on the allocation matrix. A buffer is simulated to store data received from each data source of the plurality of data sources that exceeds a predefined download bandwidth value of a respective transmitter of the plurality of transmitters. (B) A plurality of performance parameter values computed by the executed storage buffer model is stored in association with the allocation matrix. (C) The allocation matrix is updated to redefine at least one split ratio of the split ratio defined for each data source of the plurality of data sources. (D) (A) through (C) is repeated with the allocation matrix replaced with the updated allocation matrix until each unique permutation of values for the split ratio defined for each data source of the plurality of data sources is processed. (E) An allocation matrix is selected from allocation matrices stored in (B) based on the plurality of performance parameter values. The selected allocation matrix is output to define a telemetry allocation for a transmission of real data by the plurality of transmitters.

In another example embodiment, a system is provided. The system includes, but is not limited to, a processor and a computer-readable medium operably coupled to the processor. The computer-readable medium has instructions stored thereon that, when executed by the processor, cause the system to select a telemetry allocation for the transmission of data from multiple transmitters.

In yet another example embodiment, a method of selecting a telemetry allocation for the transmission of data from multiple transmitters is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 6B depicts an allocation pie chart and a buffer size usage history for the nineteenth telemetry allocation for the first transmitter in accordance with an illustrative embodiment.

DETAILED DESCRIPTION

Figure 1:
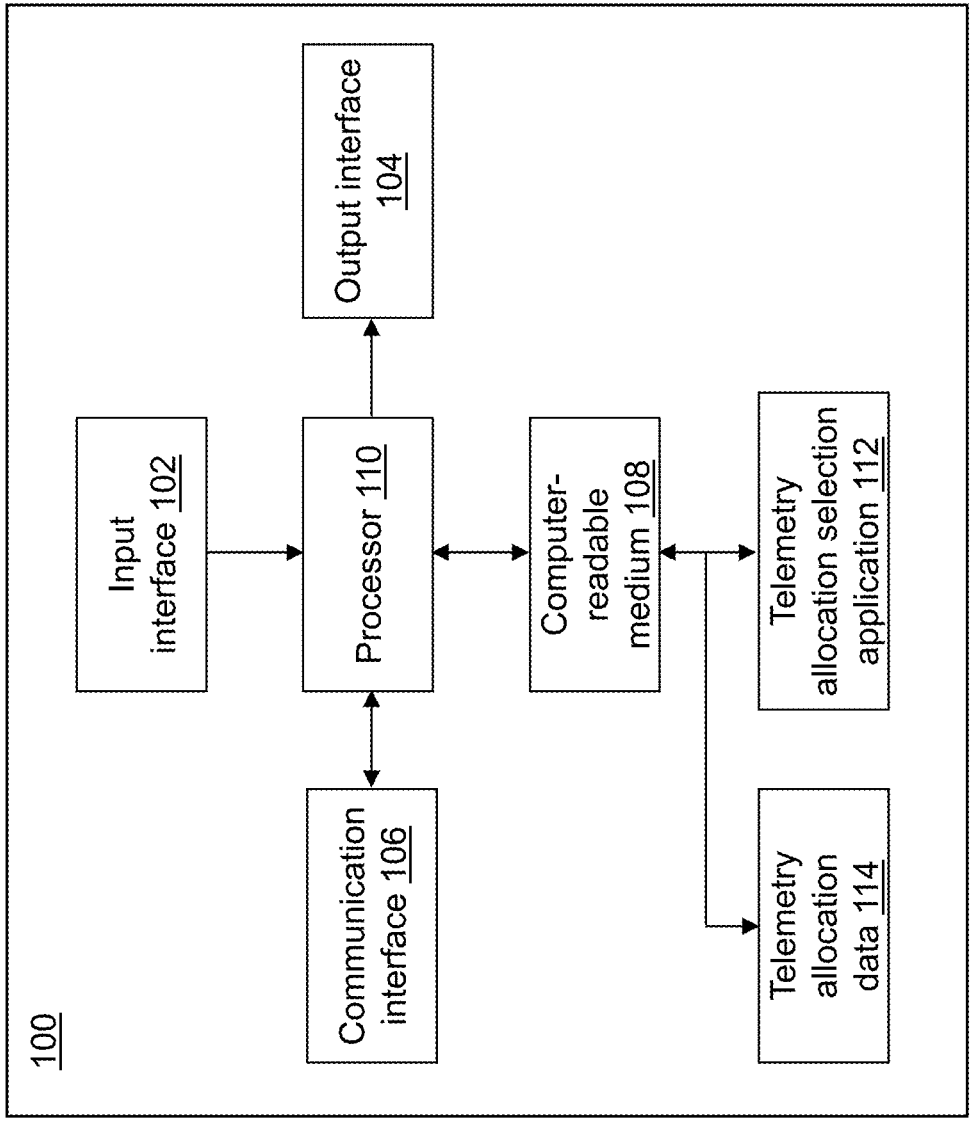
FIG. 1 depicts a block diagram of a telemetry allocation selector in accordance with an illustrative embodiment.

Referring to FIG. 1, a block diagram of a telemetry allocation selector 100 is shown in accordance with an illustrative embodiment. Telemetry allocation selector 100 may include an input interface 102, an output interface 104, a communication interface 106, a non-transitory computer-readable medium 108, a processor 110, a telemetry allocation selection application 112, and telemetry allocation data 114. Fewer, different, and/or additional components may be incorporated into telemetry allocation selector 100. Telemetry allocation selection application 112 identifies an allocation of telemetry data, received from one or more sensors, to a transmitter of a plurality of transmitters. When there is a plurality of data sources for data to be transmitted by the plurality of transmitters, there may be many allocation permutations to route and transmit the data. Telemetry allocation selection application 112 selects an allocation permutation that satisfies the operational requirements associated with performance parameters that result when a particular allocation is applied as described further below.

Input interface 102 provides an interface for receiving information from the user or another device for entry into telemetry allocation selector 100 as understood by those skilled in the art. Input interface 102 may interface with various input technologies including, but not limited to, a keyboard, a microphone, a mouse, a display, a track ball, a keypad, one or more buttons, etc., to allow the user to enter information into telemetry allocation selector 100 or to make selections presented in a user interface displayed on the display. Telemetry allocation selector 100 may have one or more input interfaces that use the same or a different input interface technology. The input interface technology further may be accessible by telemetry allocation selector 100 through communication interface 106.

Output interface 104 provides an interface for outputting information for review by a user of telemetry allocation selector 100 and/or for use by another application or device. For example, output interface 104 may interface with various output technologies including, but not limited to, the display, a second non-transitory computer-readable medium external to telemetry allocation selector 100, etc. Telemetry allocation selector 100 may have one or more output interfaces that use the same or a different output interface technology. The output interface technology further may be accessible by telemetry allocation selector 100 through communication interface 106. The same interface may support both input interface 102 and output interface 104. For example, a touch screen provides a mechanism for user input and for presentation of output to the user.

Communication interface 106 provides an interface for receiving and transmitting data between devices using various protocols, transmission technologies, and media as understood by those skilled in the art. Communication interface 106 may support communication using various transmission media that may be wired and/or wireless. Telemetry allocation selector 100 may have one or more communication interfaces that use the same or a different communication interface technology. For example, telemetry allocation selector 100 may support communication using an Ethernet port, a Bluetooth antenna, a telephone jack, a USB port, etc. Data and/or messages may be transferred between telemetry allocation selector 100 and other devices using communication interface 106. In an alternative embodiment, data and/or messages may be transferred between telemetry allocation selector 100 and the other devices using input interface 102 and/or output interface 104.

Computer-readable medium 108 is an electronic holding place or storage for information, so the information can be accessed by processor 110 as understood by those skilled in the art. Computer-readable medium 108 can include, but is not limited to, any type of random access memory (RAM), any type of read-only memory (ROM), any type of flash memory, etc., such as magnetic storage devices (e.g., hard disk, floppy disk, magnetic strips, . . . ), optical disks (e.g., compact disc (CD), digital versatile disc (DVD), . . . ), smart cards, flash memory devices, etc. Telemetry allocation selector 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Telemetry allocation selector 100 also may have one or more drives that support the loading of a memory media such as a CD, DVD, an external hard drive, etc. One or more external hard drives further may be connected to telemetry allocation selector 100 using communication interface 106.

Processor 110 executes instructions as understood by those skilled in the art. The instructions may be carried out by a special-purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Telemetry allocation selector 100 may include a plurality of processors that use the same or a different processing technology.

Telemetry allocation selection application 112 performs operations associated with selecting an allocation of telemetry data, received from one or more sensors, to a transmitter of a plurality of transmitters. Some or all of the operations described herein may be embodied in telemetry allocation selection application 112. The operations may be implemented using hardware, firmware, software, or any combination of these methods. Referring to the example embodiment of FIG. 1, telemetry allocation selection application 112 is implemented in software (comprised of computer-readable and/or computer-executable instructions) stored in computer-readable medium 108 and accessible by processor 110 for execution of the instructions that embody the operations of telemetry allocation selection application 112. Telemetry allocation selection application 112 may be written using one or more programming languages, assembly languages, scripting languages, etc. Telemetry allocation selection application 112 may be integrated with other data processing functions.

Telemetry allocation data 114 may include values associated with parameters that define a selection and a transmission of data, received from the one or more sensors, for transmission by the plurality of transmitters. A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a velocity sensor, an acceleration sensor, etc., that may be mounted to various components used as part of a device or system.

Figure 3:
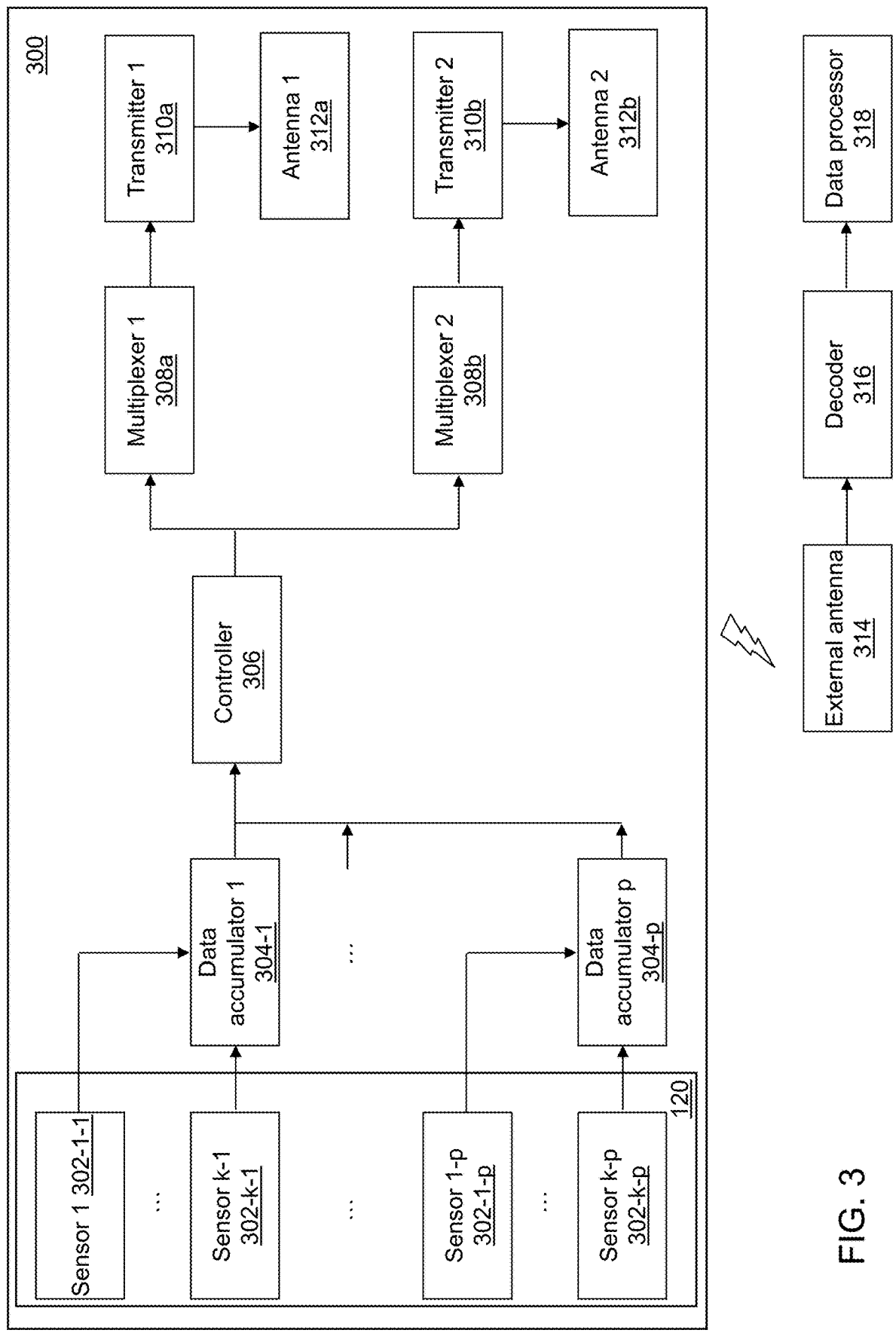
FIG. 3 depicts a block diagram of a transmission system in accordance with an illustrative embodiment.

Merely for illustration, the device or system is a multi-stage rocket 400 (shown referring to FIG. 4) where the one or more sensors are mounted to measure various datum values associated with operation of each stage of the multi-stage rocket. Referring to FIG. 3, a block diagram of a transmission system 300 is shown in accordance with an illustrative embodiment. In the illustrative embodiment, transmission system 300 may include the one or more sensors where subsets of the one or more sensors send their sensed datums to different data accumulators that are intermediate devices between the one or more sensors and a plurality of controllers. For example, a first sensor subset includes sensors 302-1-1 to 302-k-1, . . . , and a $p^{th}$ sensor subset includes sensors 302-1-p to 302-k-p, where k may be different for each subset. The one or more sensors may include any number of sensors of any type and combination of types. Each sensor of the one or more sensors may send a respective sensed datum to data accumulator 1 304-1, . . . , or data accumulator p 304-p at a predefined data rate that may vary as a function of time based on the data needs associated with analysis of the sensor data.

Each sensor of the one or more sensors may send the respective sensed datum to controller 306 according to a transmission allocation determined by telemetry allocation selector 100. For example, the first sensor subset communicates its sensed datums to a first data accumulator 304-1, . . . , and the $p^{th}$ sensor subset communicates its sensed datums to a $p^{th}$ data accumulator 304-p. First data accumulator 304-1, . . . , and $p^{th}$ data accumulator 304-p communicate their sensed datums to a transmission controller, such as a controller 306.

Controller 306 executes a telemetry allocation to determine which sensed datums are sent to a multiplexer 1 308a and which sensed datums are sent to a multiplexer 2 308b. Multiplexer 1 308a may multiplex its received portion of the data from controller 306 before sending the data to transmitter 1 310a. Multiplexer 2 308b may multiplex its received portion of the data from controller 306 before sending the data to transmitter 2 310b.

Multiplexer 1 308a and multiplexer 2 308b may behave as a multiple-input, single-output switch that creates an output stream on a single channel based on various rules such as a bandwidth allocation to either individual sensors or groups of sensors associated with a component or function of the device. The system or device may include a plurality of multiplexers to output different channels of data, for example, using different frequencies or encoding and/or to form a larger multiplexer that handles a greater number of input sensor channels. In an illustrative embodiment, multiplexer 1 308a and multiplexer 2 308b are implemented electronically. In an alternative embodiment, multiplexer 1 308a and multiplexer 2 308b may be integrated with controller 306. Multiplexer 1 308a and/or multiplexer 2 308b may further receive sensed data from other controllers, from other sensors of the one or more sensors that are not processed by data accumulator 1 304-1, . . . , or data accumulator p 304-p, and/or from other intermediate devices.

Multiplexer 1 308a sends its output stream to a transmitter 1 310a. Transmitter 1 310a generates a signal stream that includes the output stream and sends it to an antenna 1 312a associated with the device such as a first antenna mounted on multi-stage rocket 400. Antenna 1 312a radiates the signal in an electromagnetic wave at a center frequency to an external antenna 314 that receives the electromagnetic wave and converts it to a received signal.

Multiplexer 2 308b sends its output stream to a transmitter 2 310b. Transmitter 2 310b generates a signal stream that includes the output stream and sends it to an antenna 2 312b associated with the device such as a second antenna mounted on multi-stage rocket 400. Antenna 2 312b radiates the signal in an electromagnetic wave at a center frequency to external antenna 314 or another external antenna that receives the electromagnetic wave and converts it to a received signal. Transmission system 300 may include a plurality of controllers, more than two multiplexers, more than two transmitters, and/or more than two antennas. Two are shown for simplicity.

For example, external antenna 314 may be a ground or satellite-based antenna. The received signal is processed by a decoder 316, for example, to associate sensor data with an originating sensor, using a sensor identifier, and to time align the sensed data, using a time included with the sensed datum. The decoded signal may be sent to a data processor 318 to process the sensed data. A stored indicator may identify data that was not sent in real time. Data processor 318 may use the sensed data to study a behavior of the system on which the one or more sensors are mounted.

Figure 4:
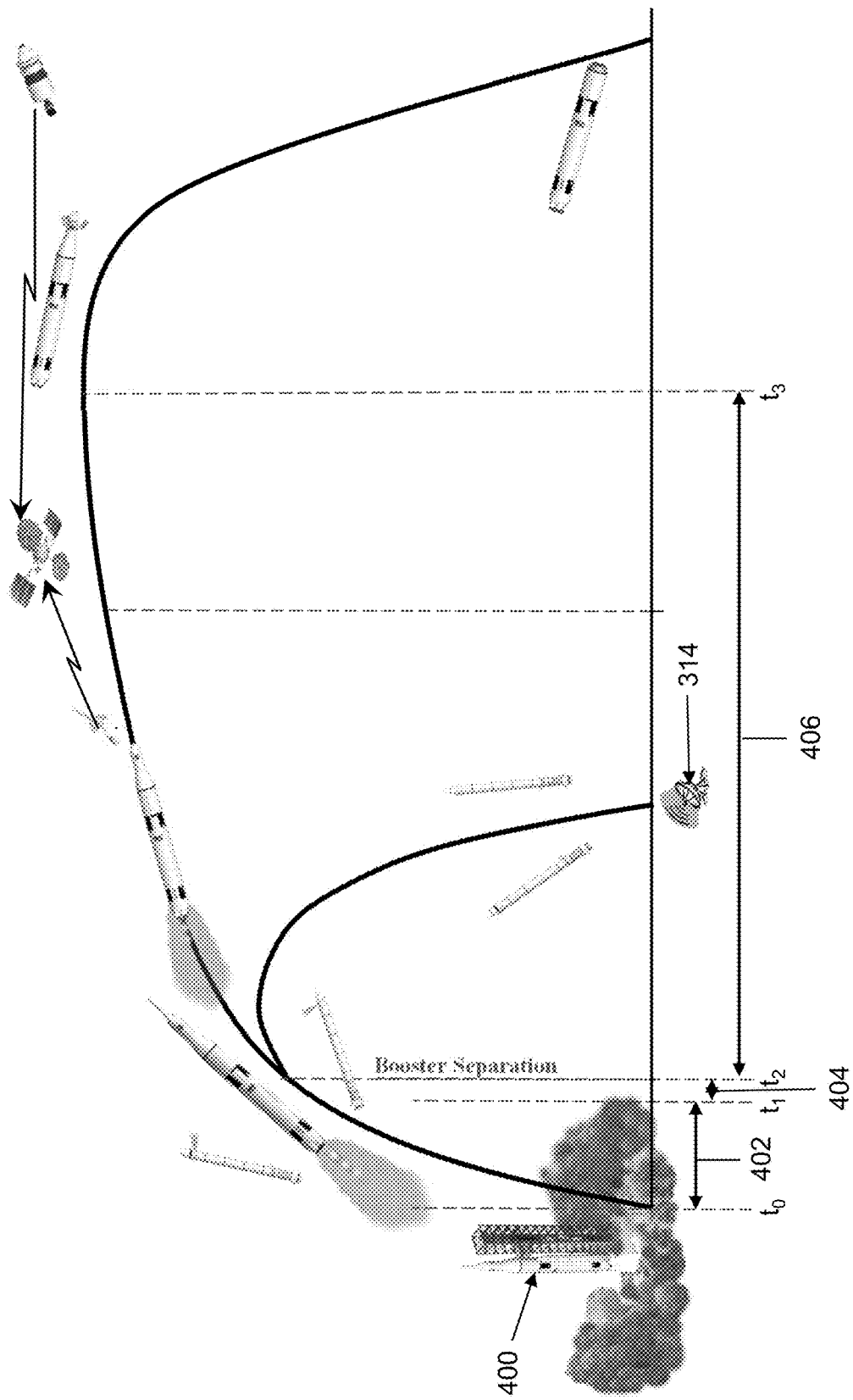
FIG. 4 depicts a flight transmission timeline in accordance with an illustrative embodiment.

Referring to FIG. 4, a flight transmission timeline is shown for multi-stage rocket 400 in accordance with an illustrative embodiment. The one or more sensors are mounted to various components of multi-stage rocket 400 as discussed above. An illustrative external antenna 314 that is ground based receives the electromagnetic wave transmissions from antenna 1 312a and antenna 2 312b mounted on multi-stage rocket 400. A first data transmission format may be used to control a content of the output stream during a first time window 402. A second data transmission format may be used to control the content of the output stream during a second time window 404. A third data transmission format may be used to control the content of the output stream during a third time window 406. The flight transmission timeline may include one or more timelines that may cover any period of time from second to minutes to hours to days.

Each format of the plurality of formats may define a bandwidth allocation to apply and a time to apply the bandwidth allocation as between each antenna and for each data source or type of data source. Within each format, a total bandwidth allocation may be allocated to individual sensors, to one or more types of sensors, to sensors associated with specific device components, and/or other groups of sensors of the one or more sensors to define a per sensor group bandwidth allocation that may be applied by multiplexer 1 308a and multiplexer 2 308b to create the output stream. A sensor group may include one or more individual sensors, one or more types of sensors, sensors associated with a common device component such as a booster, and/or any other predefined group of sensors of the one or more sensors. Multiplexer 1 308a and multiplexer 2 308b may further process overhead associated with the data stream that is included in the output stream as well as, for example, other flight control information.

Each format of the plurality of formats may further include a real-time download rate, an excess bandwidth flag, an encoding type for the sensor datums, etc. The real-time download rate may be a value that is greater than zero and less than or equal to one and indicate a rate at which sensor data is incorporated as fast as possible (in real time) into each output stream. The real-time download rate may be defined separately for each sensor group and/or for each format of the plurality of formats. For example, when the real-time download rate is one, all of the sensor data created by a sensor included in the associated sensor group may be downloaded as fast as possible. As another example, when the real-time download rate is 0.5, every other sensor datum created by a sensor included in the associated sensor group may be downloaded as fast as possible while remaining sensor datums are stored for transmission at a later time.

The excess bandwidth flag may indicate whether an associated format has bandwidth available in which to incorporate sensor datums from the stored sensor datums into the output stream. The encoding type may be defined separately for each sensor group and/or for each format of the plurality of formats. For example, an excess bandwidth flag that indicates true, such as by a value of one, indicates that sensor datums from the stored sensor datums can be incorporated into the output stream; whereas, an excess bandwidth flag that indicates false, such as by a value of zero, indicates that sensor datums from the stored sensor datums cannot be incorporated into the output stream while a current format is active. When the excess bandwidth flag indicates true, an excess bandwidth value may be defined to indicate how much of the bandwidth may be allocated to incorporate sensor datums from the stored sensor datums into the output stream.

The encoding type may indicate how sensor datums in the stored sensor datums are incorporated into the output stream. The value of the encoding type may be zero or not defined when the real-time download rate is one for a sensor grouping. The encoding type may be defined separately for each sensor group and/or for each format of the plurality of formats. For example, the encoding type may indicate that the sensor datums in the stored sensor datums are incorporated into the output stream in the order in which they were stored.

As another example, the encoding type may indicate that the sensor datums in the stored sensor datums are incorporated into the output stream using a secondary download rate. For example, the secondary download rate may be a value that is greater than zero and less than or equal to one and indicate a rate at which a sensor datum created by a sensor included in the associated sensor group is read from the stored sensor datums and incorporated into the output stream. As an example, when the secondary download rate is one, all of the sensor data created by each sensor included in the associated sensor group may be read from the stored sensor datums into a buffer for transmission as fast as possible. As another example, when the secondary download rate is 0.5, every other sensor datum created by a sensor included in the associated sensor group may be read from the stored sensor datums into the buffer for transmission as fast as possible, while a remaining sensor datum remains in the stored sensor datums. The sensor datums that remain in the stored sensor datums may be read from the stored sensor datums into the buffer for transmission as fast as possible once the sensor datums stored in the stored sensor datums have been processed as discussed further below. As an option, the value of the encoding type may indicate the secondary download rate or, alternatively, a distinct value may be defined for each format.

For illustration, a first format is shown below that is active until a first transition time $t_1$ after a start time to that may be zero.

| Sensor Group | Bandwidth allocation megabits/second | Real-time download rate | Excess bandwidth flag | Encoding type |
| --- | --- | --- | --- | --- |
| Core stage | 10 | 0.25 | 0 | 0 |
| Engine | 0.5 | 1.0 | 0 | 0 |
| Payload | 0.5 | 1.0 | 0 | 0 |
| Booster | 6 | 1.0 | 0 | 0 |
| Overhead | 4 | 1.0 | 0 | 0 |
| Total | 21 | | | |

The sensor group "Core stage" refers to sensors that are associated with a core stage of multi-stage rocket 400. The sensor group "Engine" refers to sensors that are associated with the engine of multi-stage rocket 400. The sensor group "Payload" refers to sensors that are associated with a payload of multi-stage rocket 400. The sensor group "Booster" refers to sensors that are associated with a booster stage of multi-stage rocket 400. The sensor group "Overhead" refers to an overhead associated with transmission of the sensor data of multi-stage rocket 400. For illustration, first transition time $t_1$ may be a few seconds before booster separation relative to a launch time of multi-stage rocket 400.

For illustration, a second format is shown below that is active until a second transition time $t_2$ after first transition time

| Sensor Group | Bandwidth allocation Mbps | Real-time download rate | Excess bandwidth flag | Encoding type |
| --- | --- | --- | --- | --- |
| Core stage | 9.5 | 0.25 | 0 | 0 |
| Engine | 0.5 | 1.0 | 0 | 0 |
| Payload | 0.5 | 1.0 | 0 | 0 |
| Booster | 5 | 1.0 | 0 | 0 |
| Overhead | 4 | 1.0 | 0 | 0 |
| Total | 19.5 | | | |

For illustration, second transition time t₂ may be just after booster separation relative to the rocket launch time. For illustration, a third format is shown below that is active until a third transition time t₃ after second transition time t₂.

| Sensor Group | Bandwidth allocation Mbps | Real-time download rate | Excess bandwidth flag | Encoding type |
|---|---|---|---|---|
| Core stage | 8.5 | 1.0 | 1 (5.5 Mbps) | 1 (0.333) |
| Engine | 0.5 | 1.0 | 0 | 0 |
| Payload | 1.5 | 1.0 | 0 | 0 |
| Booster | 0.0 | 1.0 | 0 | 0 |
| Overhead | 4.0 | 1.0 | 0 | 0 |
| Total | 14.5 | | | |

The third format defines utilization of the excess bandwidth of 5.5 Mbps that becomes available because the booster has separated and sensor data associated with the booster no longer needs to be included in the output stream. Sensor data related to the core stage in excess of what could be downloaded in real time is generated and written to the stored sensor datums. As a result, a higher sampling rate can be generated from one or more of the sensors associated with the "Core stage" sensor group, though the higher sampling rate is not needed in real time. Instead, one of every four sensor datums is to be downloaded in real time while the remaining three are to be stored in the stored sensor datums to be downloaded after second transition time t₂ when excess bandwidth is available. The encoding type with the secondary download rate of 0.333 indicates that one of every three sensor datums stored in the stored sensor datums is downloaded first. Once those have been processed, one of every two remaining sensor datums stored in the stored sensor datums is downloaded next. Once those have been processed, the remaining sensor datums the stored sensor datums are downloaded.

Figure 2:
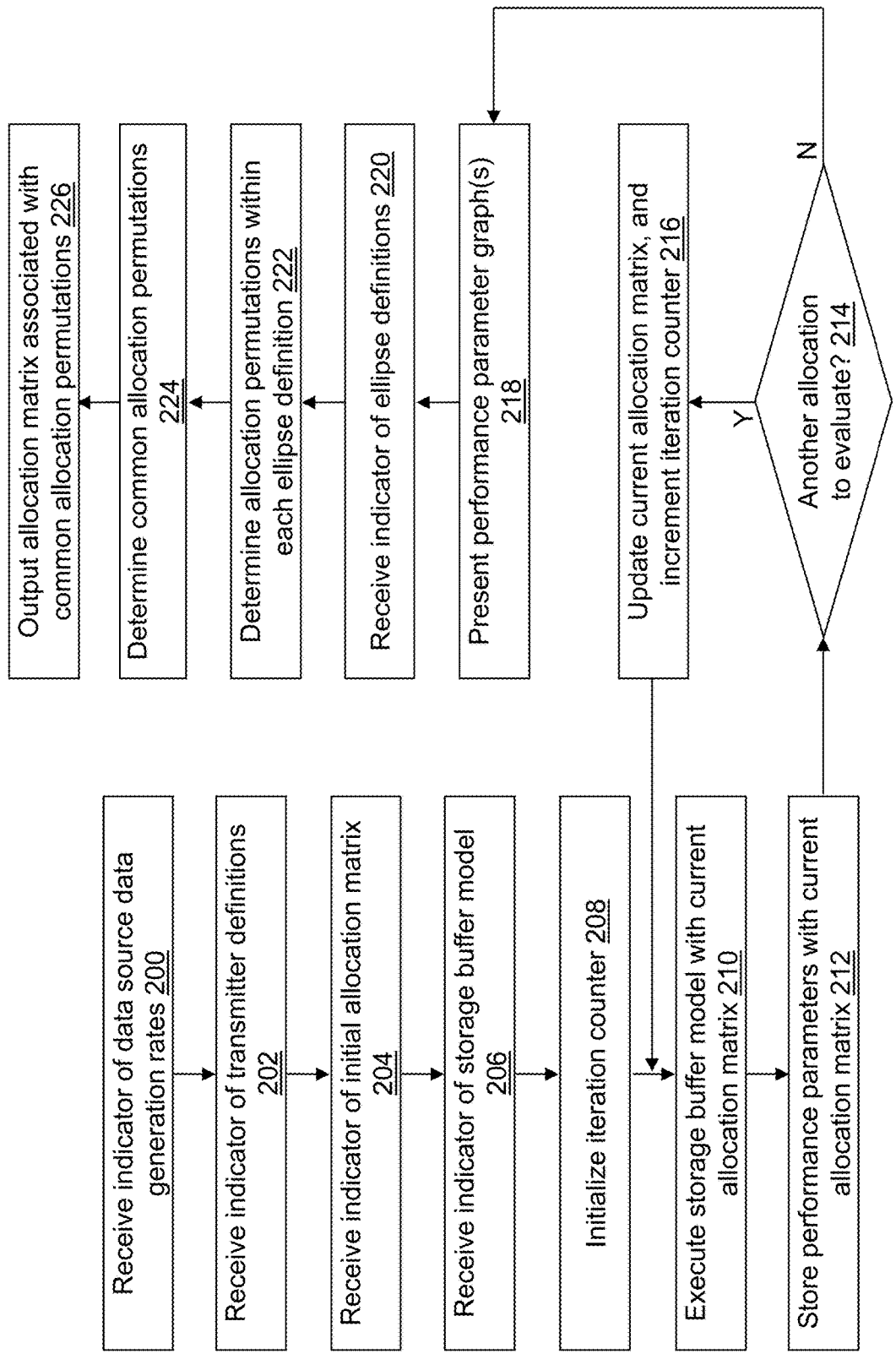
FIG. 2 depicts a flow diagram illustrating examples of operations performed by a telemetry allocation selection application of the telemetry allocation selector of FIG. 1 in accordance with an illustrative embodiment.

Referring to FIG. 2, example operations associated with telemetry allocation selection application 112 are described. Telemetry allocation selection application 112 determines an allocation of a sensor or sensor group to an antenna while applying the transmission parameters for a specific format that may or may not change during the flight transmission timeline. Additional, fewer, or different operations may be performed depending on the embodiment of telemetry allocation selection application 112. The order of presentation of the operations of FIG. 2 is not intended to be limiting. Some of the operations may not be performed in some embodiments. Although some of the operational flows are presented in sequence, the various operations may be performed in various repetitions, in parallel, and/or in other orders than those that are illustrated.

In an operation 200, a first indicator may be received that indicates a data generation rate for each data source as a function of time and how the data sources are grouped to define a transmission allocation. For example, the data generation rate may be the same throughout a simulated timeline or may change based on various events that may be defined to occur as a function of time.

In an operation 202, a second indicator may be received that indicates transmitter definitions that describe characteristics of each transmitter of the plurality of transmitters, such as transmitter 1 310a and transmitter 2 310b of illustrative transmission system 300. For illustration, each transmitter definition may include a bandwidth download value for each transmitter of the plurality of transmitters.

In an operation 204, a third indicator may be received that indicates an initial allocation matrix that describes an allocation to each transmitter of the plurality of transmitters, such as transmitter 1 310a and transmitter 2 310b of illustrative transmission system 300 from each sensor or sensor group. For example, the third indicator indicates a location and a name of the initial allocation matrix. As an example, the third indicator may be received by telemetry allocation selection application 112 after selection from a user interface window or after entry by a user into a user interface window. In an alternative embodiment, the initial allocation matrix may not be selectable. For example, the initial allocation matrix may be accessed automatically by telemetry allocation selection application 112 using a default location and name or may be defined using default values. For illustration, the initial allocation matrix in an illustrative embodiment is shown below in Table 1.

| Data source group | Transmitter 1 310a | Transmitter 2 310b | Range variation indicator | Allocation step size |
|---|---|---|---|---|
| Core stage | 1 | 0 | fixed | n/a |
| Engine | 0 | 1 | binary | n/a |
| Payload | 0 | 1 | 0-1 | 0.05 |
| Booster | 0.2 | 0.8 | 0.2-0.8 | 0.1 |
| Overhead | 0 | 1 | 0-1 | 0.05 |

An allocation between the transmitters sums to one for each data source group. Some rows may vary over a range of values, whereas, other rows may not vary at all or may be a binary selection because the system operator intends for a specific transmitter to always process data from the specific data source group or for all of the data to be provided by one of the transmitters. For example, in Table 1, transmitter 1 310a always processes all of the data related to core stage sensors/data sources. The range column indicates a range of values that can be evaluated for each transmitter.

As another example, all of the data related to engine sensors/data sources is either allocated to transmitter 1 310a or to transmitter 2 310b as indicated by "binary". The engine sensors/data sources is not split between transmitters such that the only optional allocations are (0,1) and (1,0), where the first value of each pair indicates a ratio of the data related to engine sensors/data sources that is allocated to transmitter 1 310a, and the second value of each pair indicates a ratio of the data related to engine sensors/data sources that is allocated to transmitter 2 310b.

As yet another example, the data related to payload sensors/data sources can be split between transmitter 1 310a and transmitter 2 310b as indicated by the range value of zero to one. The range value of zero to one indicates that allocation values (0,1), (0.05, 0.95), (0.1, 0.9), . . . , (0.95, 0.05), (1,0) can be evaluated, where the first value of each pair indicates a ratio of the data related to payload sensors/data sources that is allocated to transmitter 1 310a, and the second value of each pair indicates a ratio of the data related to payload sensors/data sources that is allocated to transmitter 2 310b.

Similarly, the data related to overhead can be split between transmitter 1 310a and transmitter 2 310b as indicated by the range value of zero to one. The range value of zero to one indicates that allocation values (0,1), (0.05, 0.95), (0.1, 0.9), . . . , (0.95, 0.05), (1,0) can be evaluated, where the first value of each pair indicates a ratio of the data related to overhead that is allocated to transmitter 1 310a, and the second value of each pair indicates a ratio of the overhead that is allocated to transmitter 2 310b.

As another example, the data related to booster sensors/data sources is always split between transmitter 1 310a and transmitter 2 310b as indicated by the range value of 0.2 to 0.8. The range value of 0.2 to 0.8 indicates that allocation values (0.2, 0.8), (0.3, 0.7), (0.4, 0.6), (0.5, 0.5), (0.6, 0.4), (0.7, 0.3), (0.8, 0.2) can be evaluated, where the first value of each pair indicates a ratio of the data related to booster sensors/data sources that is allocated to transmitter 1 310a, and the second value of each pair indicates a ratio of the booster sensors/data sources that is allocated to transmitter 2 310b.

Each allocation permutation for each sensor group adds to one because all of the data is to be transmitted by one of the available transmitters. Again, two transmitters are shown for simplicity. There may be more than two transmitters. The allocation ratio, also referred to as a split ratio, defines how the data from a data source is split between the available transmitters. Telemetry allocation selection application 112 evaluates all of the possible allocation permutations to determine those that satisfy communication system requirements.

Again, each allocation can be based on any data source grouping defined by the user. The allocation permutations that are evaluated can be controlled by the user based on their system communication requirements. Table 1 is merely for illustration of various options. For example, all of the data sources may be defined to have a binary allocation so that none of the data associated with a specific data source, as defined by the user, is split between the available transmitters. In an alternative embodiment, a single allocation step size may be used instead of allowing a value for each data source.

In an operation 206, a fourth indicator of a storage buffer model may be received. For example, the fourth indicator indicates a name of a storage buffer model. The fourth indicator may be received by telemetry allocation selection application 112 after selection from a user interface window or after entry by a user into a user interface window. A default value for the storage buffer model may further be stored, for example, in computer-readable medium 108. Of course, the storage buffer model may be labeled or selected in a variety of different manners by the user as understood by a person of skill in the art.

In an alternative embodiment, the storage buffer model may not be selectable, and a single storage buffer model is implemented in telemetry allocation selection application 112. As an example, the storage buffer model may determine an amount of data as a function of time based on the data generation rate for each data source as a function of time and how the data sources are grouped. The storage buffer model then may determine a transmission flow to each transmitter along with a buffer that is filling when the amount of data to transmit exceeds the bandwidth download value for each respective transmitter of the plurality of transmitters. When the amount of data to transmit is less than the bandwidth download value for each respective transmitter, data from the buffer is withdrawn and added to the transmission flow to each transmitter until the buffer is empty and/or the timeline is finished.

In an operation 208, an iteration counter is initialized, for example, to one.

In an operation 210, the storage buffer model is executed using a current allocation matrix. The storage buffer model simulates a transmission history for each transmitter of a defined transmission system given the data generation rate and the bandwidth download value. On a first iteration of operation 210, the current allocation matrix is the initial allocation matrix that defines the allocation between the transmitters for each data source. For example, based on Table 1 above, the initial allocation matrix is

| Allocation matrix $1^{st}$ iteration | | |
|---|---|---|
| Data source | Transmitter 1 310a | Transmitter 2 310b |
| Core stage | 1 | 0 |
| Engine | 0 | 1 |
| Payload | 0 | 1 |
| Booster | 0.2 | 0.8 |
| Overhead | 0 | 1 |

Figure 11:
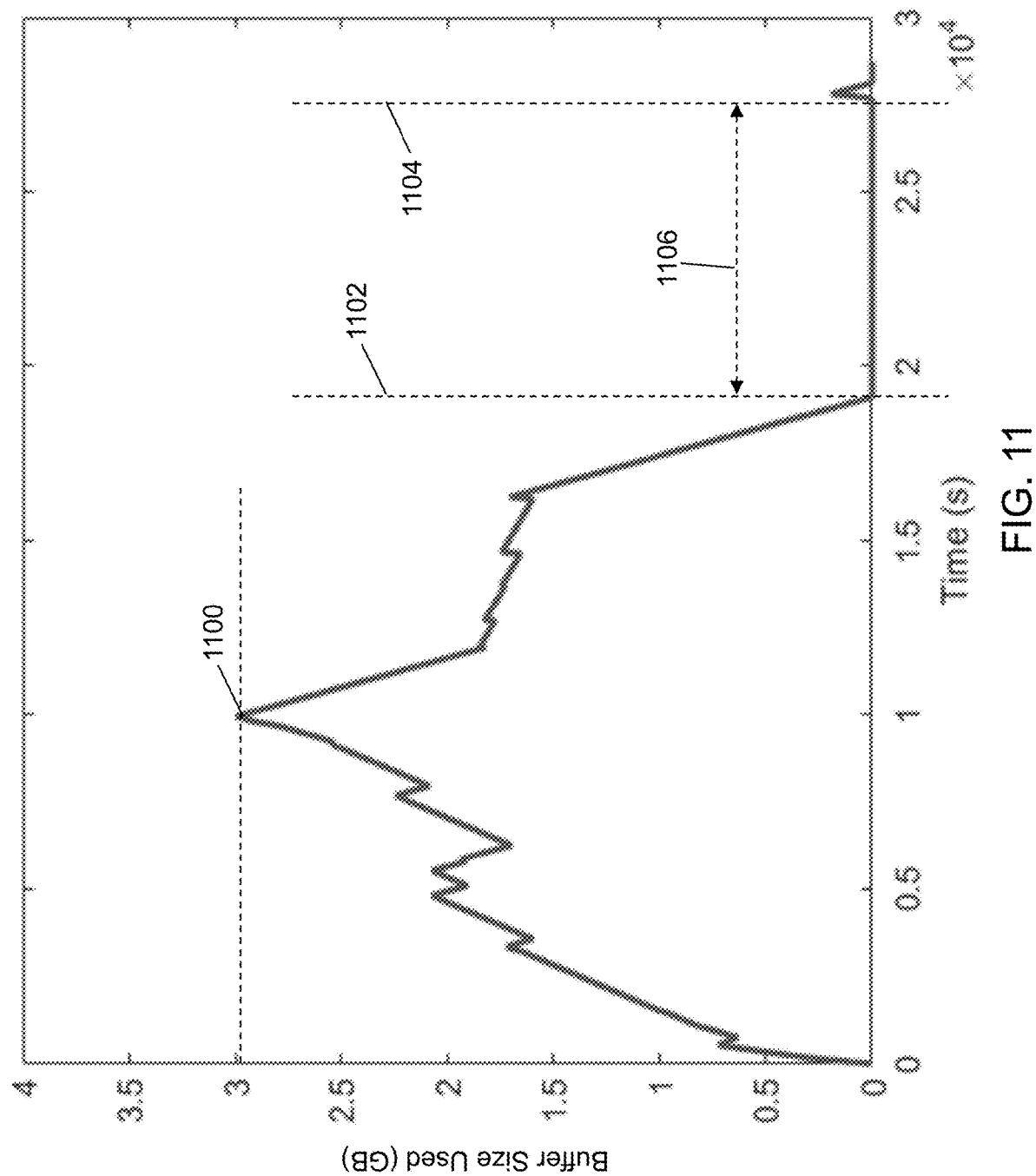
FIG. 11 depicts a buffer usage history for the first transmitter in accordance with an illustrative embodiment.

For illustration, the storage buffer model simulates application of the current allocation matrix to define the transmission flow and how the buffer is filled and unfilled. For example, referring to FIG. 11, a buffer usage determined as a function of time by the storage buffer model is shown for a current allocation matrix. Various characteristics of the buffer usage can be determined to characterize the performance of the current allocation matrix. For example, a maximum buffer size used value 1100 indicates a maximum amount of the buffer used during simulation of the transmission flow with the current allocation matrix. A buffer zero time value 1102 indicates a time when an amount of buffer used first reaches zero. A last event time value 1104 indicates a time when a last event, if any, is indicated for the data generation in operation 200. A margin value 1106 indicates a difference between buffer zero time value 1102 and last event time value 1104. Margin value 1106 is computed as an overall sum of the bandwidth used across all of the data sources. A number of split data source transmissions value may be used to characterize a complexity of the current allocation matrix. For example, a number of data sources for which transmission is split between multiple transmitters of the plurality of transmitters may be determined from the current allocation matrix. Using Table 1 above for illustration, the number of split data source transmissions value is one for the initial allocation matrix because only the booster sensors/data sources is split between the transmitters. Other hardware limitations such as imagery system requirements further may be defined by the user.

For example, based on Table 1 above, the allocation matrix on a second iteration may be

| Allocation matrix $2^{nd}$ iteration | | |
|---|---|---|
| Data source | Transmitter 1 310a | Transmitter 2 310b |
| Core stage | 1 | 0 |
| Engine | 1 | 0 |
| Payload | 0 | 1 |
| Booster | 0.2 | 0.8 |
| Overhead | 0 | 1 |

For example, based on Table 1 above, the allocation matrix on a third iteration may be Allocation matrix 3rd iteration

| Data source | Transmitter 1 310a | Transmitter 2 310b |
|---|---|---|
| Core stage | 1 | 0 |
| Engine | 0 | 1 |
| Payload | 0.05 | 0.95 |
| Booster | 0.2 | 0.8 |
| Overhead | 0 | 1 |

For example, based on Table 1 above, the allocation matrix on a fourth iteration may be Allocation matrix 4th iteration

| Data source | Transmitter 1 310a | Transmitter 2 310b |
|---|---|---|
| Core stage | 1 | 0 |
| Engine | 1 | 0 |
| Payload | 0.05 | 0.95 |
| Booster | 0.2 | 0.8 |
| Overhead | 0 | 1 |

The iterations continue until each unique allocation permutation for each combination of data sources is processed.

In an operation 212, performance parameters computed from execution of the storage buffer model are stored, for example, in non-transitory computer-readable medium 108. For example, the current allocation matrix may be stored in association with maximum buffer size used value 1100, buffer zero time value 1102, margin value 1106, the number of split data source transmissions value, etc., that are the performance parameters. The iteration counter further may be stored in association with the current allocation matrix.

Figure 5A:
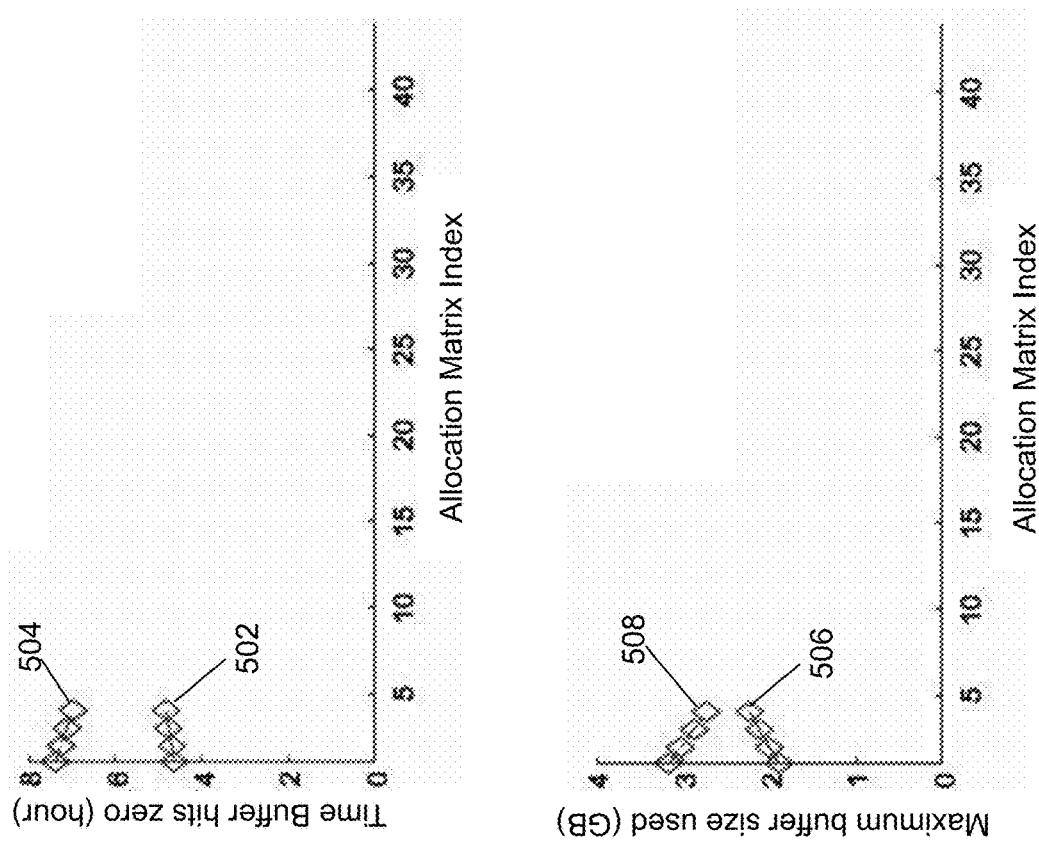
FIG. 5A depicts an allocation matrix, a buffer zero time, and a maximum buffer size used for a fourth telemetry allocation in accordance with an illustrative embodiment.
Figure 5B:
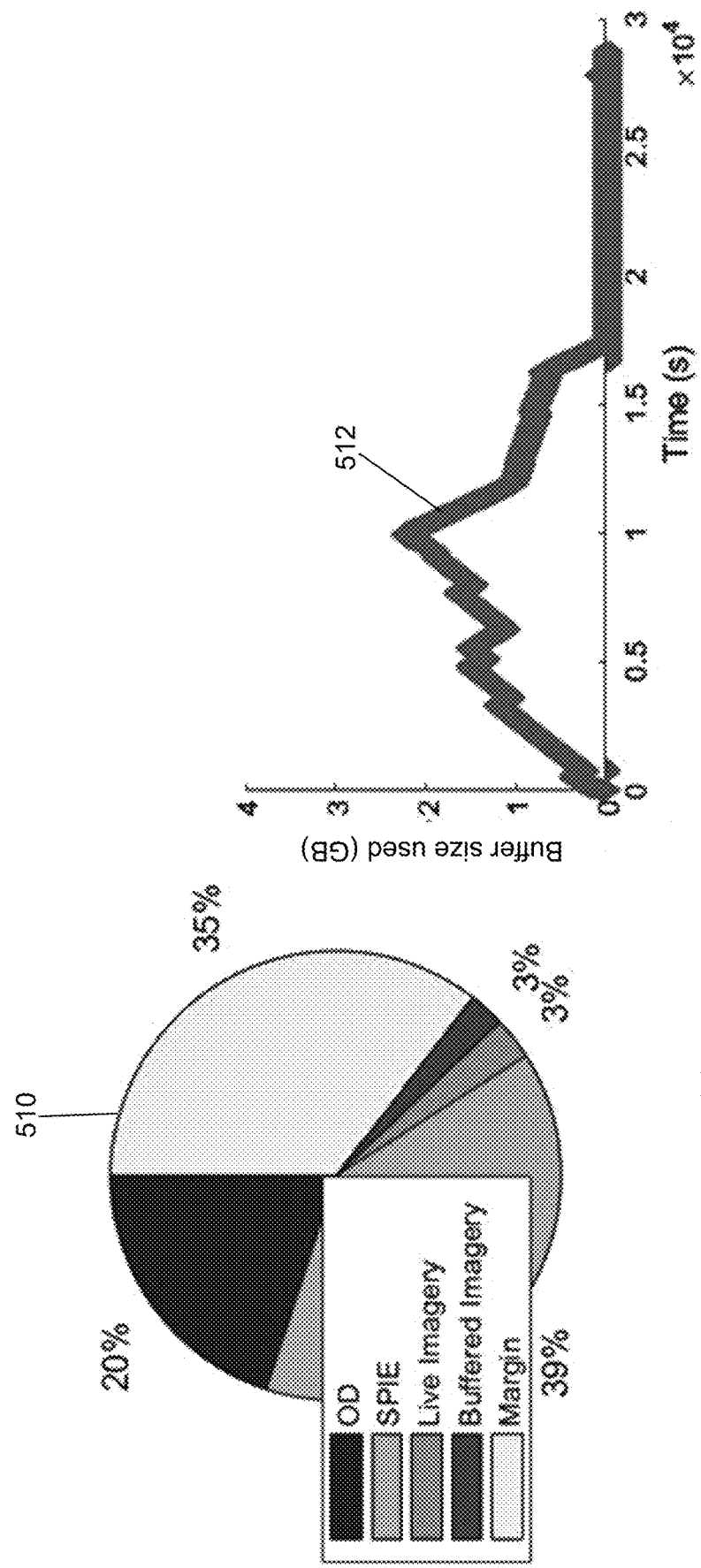
FIG. 5B depicts an allocation pie chart and a buffer size usage history for the fourth telemetry allocation for a first transmitter in accordance with an illustrative embodiment.
Figure 5C:
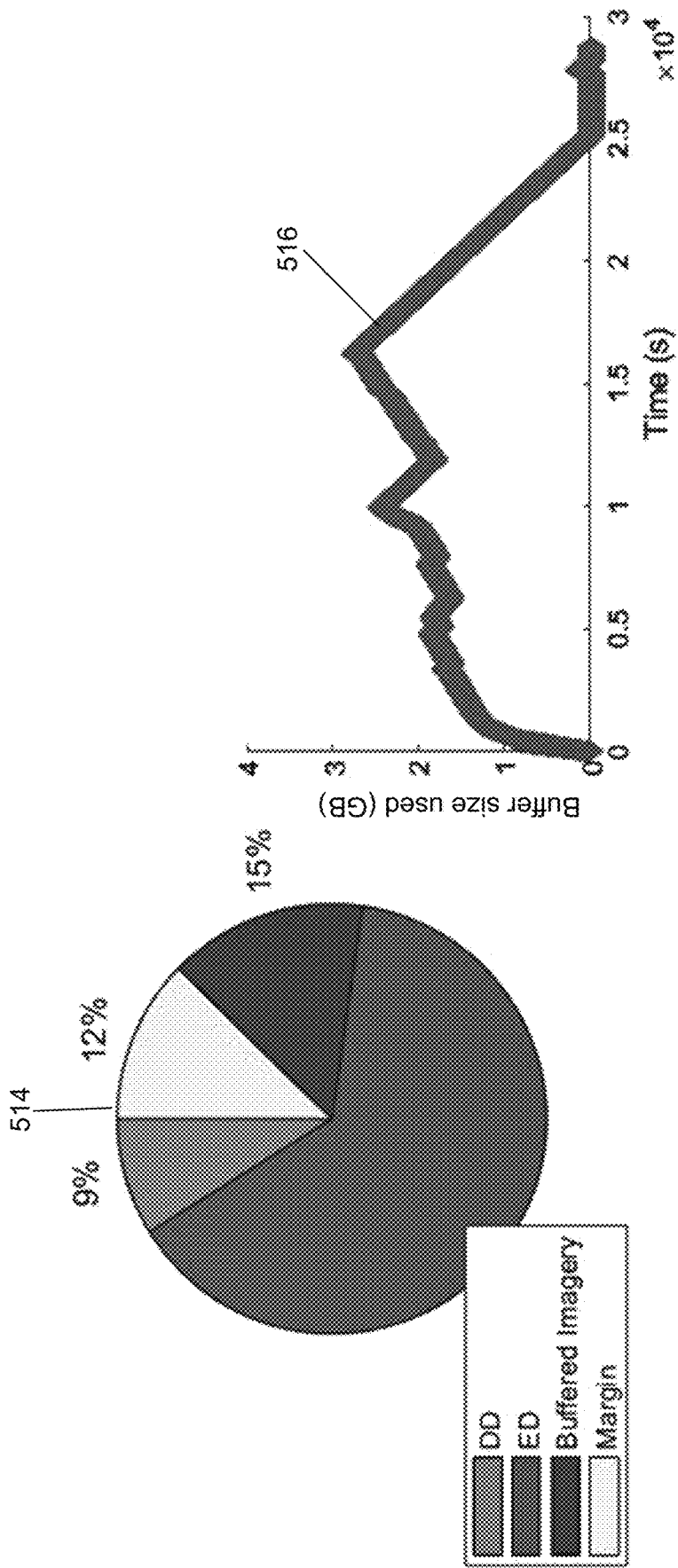
FIG. 5C depicts an allocation pie chart and a buffer size usage history for the fourth telemetry allocation for a second transmitter in accordance with an illustrative embodiment.

For illustration, referring to FIG. 5A, a fourth allocation matrix 500 may be the current allocation matrix. A first data point 502 may indicate the buffer zero time value for a first transmitter computed using fourth allocation matrix 500. A second data point 504 may indicate the buffer zero time value for a second transmitter computed using fourth allocation matrix 500. A third data point 506 may indicate the maximum buffer size used value for the first transmitter computed using fourth allocation matrix 500. A fourth data point 508 may indicate the maximum buffer size used value for the second transmitter computed using fourth allocation matrix 500. Referring to FIG. 5B, a first pie chart 510 shows an overall allocation by data source to the first transmitter using fourth allocation matrix 500, and a first buffer usage history curve 512 shows the buffer usage as a function of time by the first transmitter. Referring to FIG. 5C, a second pie chart 514 shows an overall allocation by data source to the second transmitter using fourth allocation matrix 500, and a second buffer usage history curve 516 shows the buffer usage as a function of time by the second transmitter.

Figure 6A:
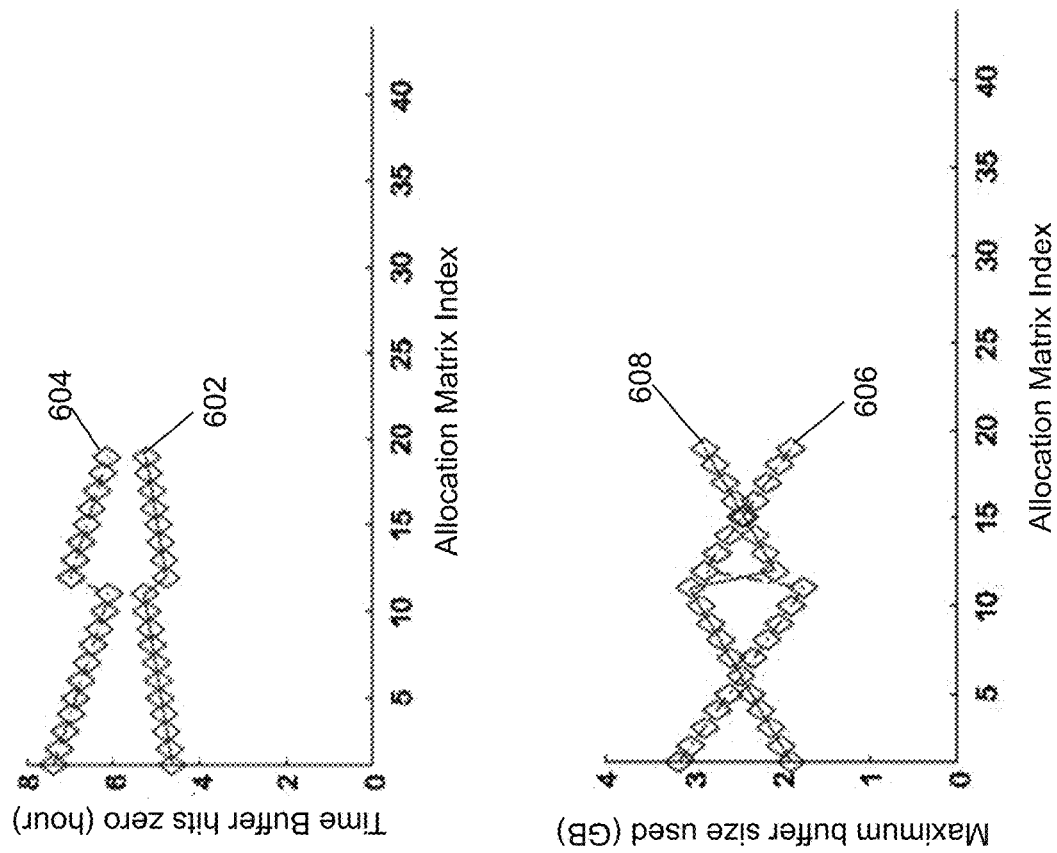
FIG. 6A depicts an allocation matrix, a buffer zero time, and a maximum buffer size used for a nineteenth telemetry allocation in accordance with an illustrative embodiment.
Figure 6C:
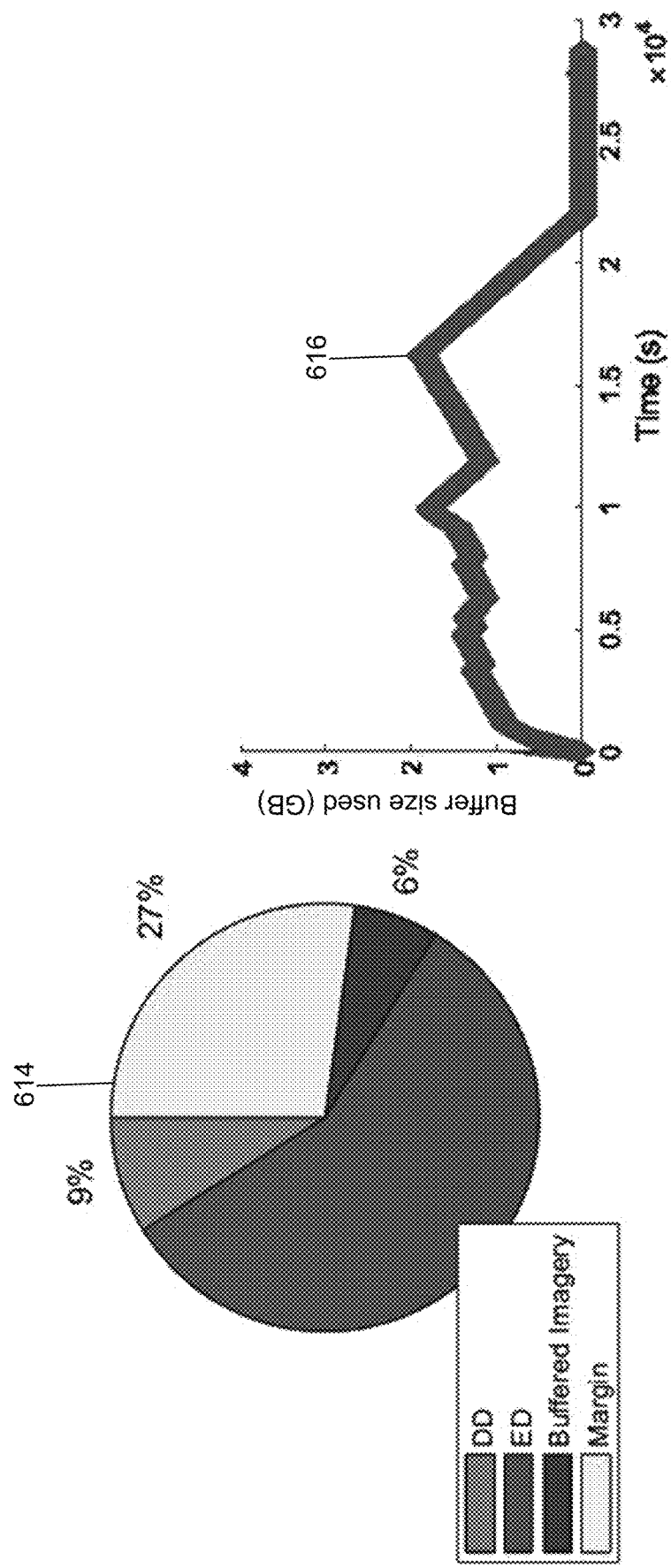
FIG. 6C depicts an allocation pie chart and a buffer size usage history for the nineteenth telemetry allocation for the second transmitter in accordance with an illustrative embodiment.

For further illustration, referring to FIG. 6A, a nineteenth allocation matrix 600 may be the current allocation matrix. A first data point 602 may indicate the buffer zero time value for a first transmitter computed using nineteenth allocation matrix 600. A second data point 604 may indicate the buffer zero time value for a second transmitter computed using nineteenth allocation matrix 600. A third data point 606 may indicate the maximum buffer size used value for the first transmitter computed using nineteenth allocation matrix 600. A fourth data point 608 may indicate the maximum buffer size used value for the second transmitter computed using nineteenth allocation matrix 600. Referring to FIG. 6B, a first pie chart 610 shows an overall allocation by data source to the first transmitter using nineteenth allocation matrix 600, and a first buffer usage history curve 612 shows the buffer usage as a function of time by the first transmitter. Referring to FIG. 6C, a second pie chart 614 shows an overall allocation by data source to the second transmitter using nineteenth allocation matrix 600, and a second buffer usage history curve 616 shows the buffer usage as a function of time by the second transmitter.

Figure 7A:
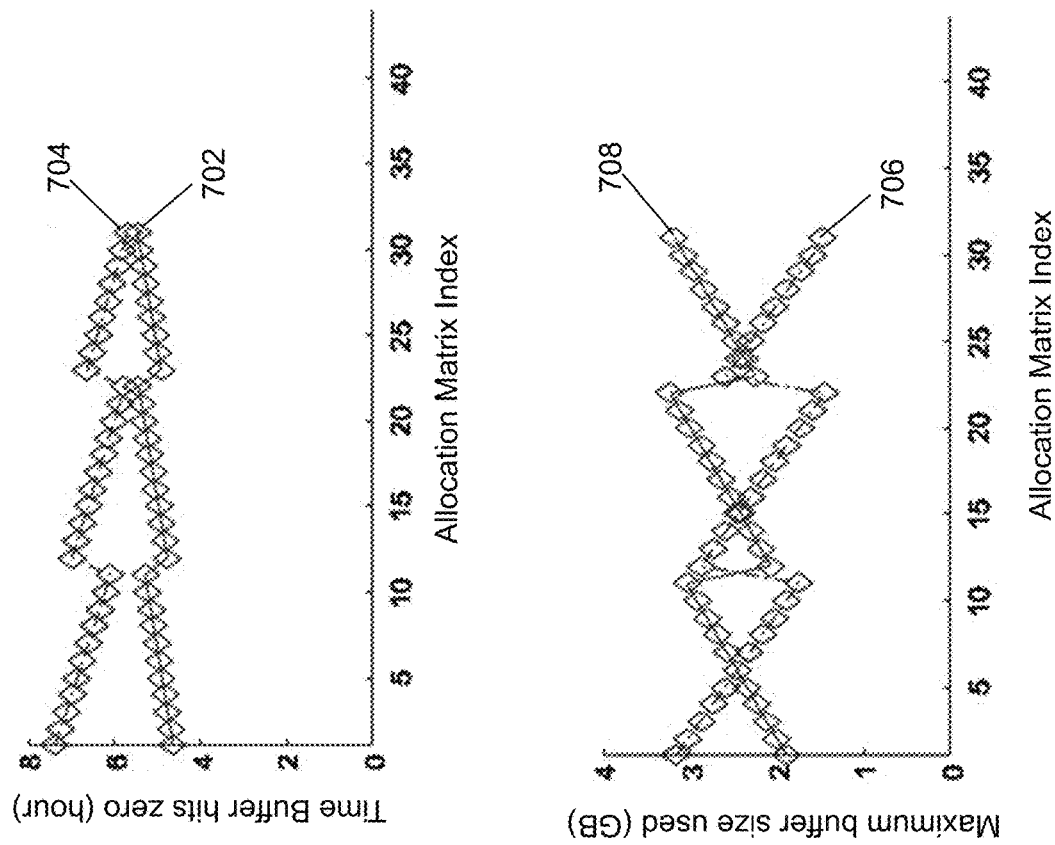
FIG. 7A depicts an allocation matrix, a buffer zero time, and a maximum buffer size used for a thirty-first telemetry allocation in accordance with an illustrative embodiment.
Figure 7B:
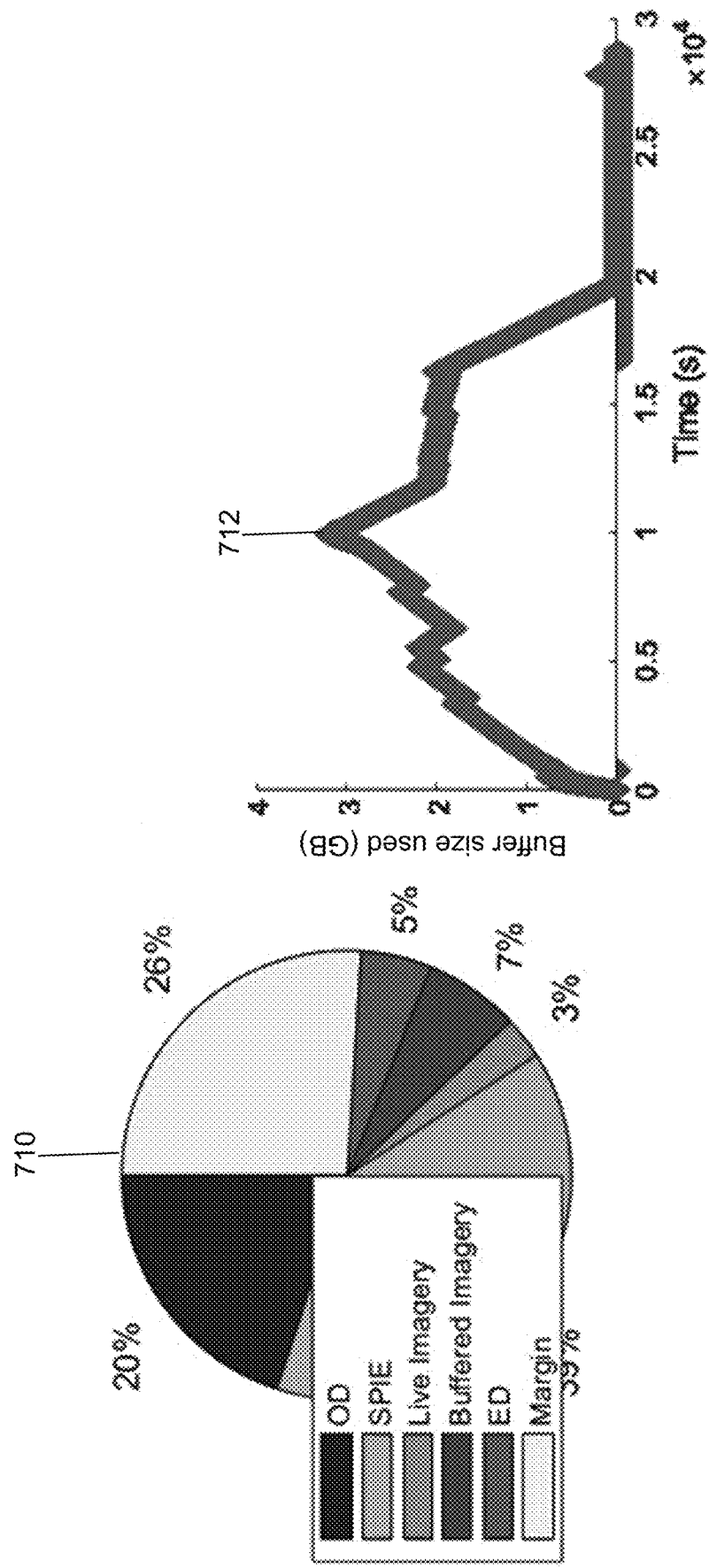
FIG. 7B depicts an allocation pie chart and a buffer size usage history for the thirty-first telemetry allocation for the first transmitter in accordance with an illustrative embodiment.
Figure 7C:
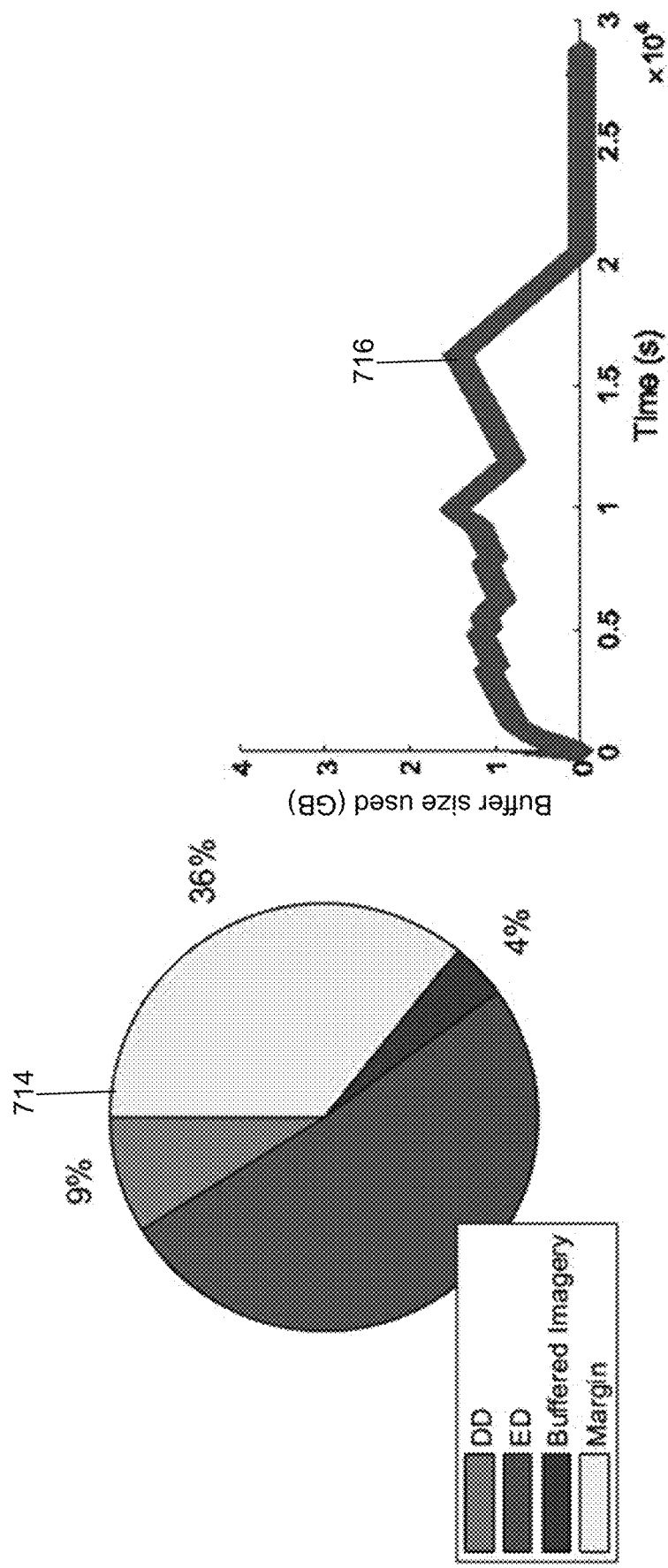
FIG. 7C depicts an allocation pie chart and a buffer size usage history for the thirty-first telemetry allocation for the second transmitter in accordance with an illustrative embodiment.

For still further illustration, referring to FIG. 7A, a thirty-first allocation matrix 700 may be the current allocation matrix. A first data point 702 may indicate the buffer zero time value for a first transmitter computed using thirty-first allocation matrix 700. A second data point 704 may indicate the buffer zero time value for a second transmitter computed using thirty-first allocation matrix 700. A third data point 706 may indicate the maximum buffer size used value for the first transmitter computed using thirty-first allocation matrix 700. A fourth data point 708 may indicate the maximum buffer size used value for the second transmitter computed using thirty-first allocation matrix 700. Referring to FIG. 7B, a first pie chart 710 shows an overall allocation by data source to the first transmitter using thirty-first allocation matrix 700, and a first buffer usage history curve 712 shows the buffer usage as a function of time by the first transmitter. Referring to FIG. 7C, a second pie chart 714 shows an overall allocation by data source to the second transmitter using thirty-first allocation matrix 700, and a second buffer usage history curve 716 shows the buffer usage as a function of time by the second transmitter.

Figure 8:
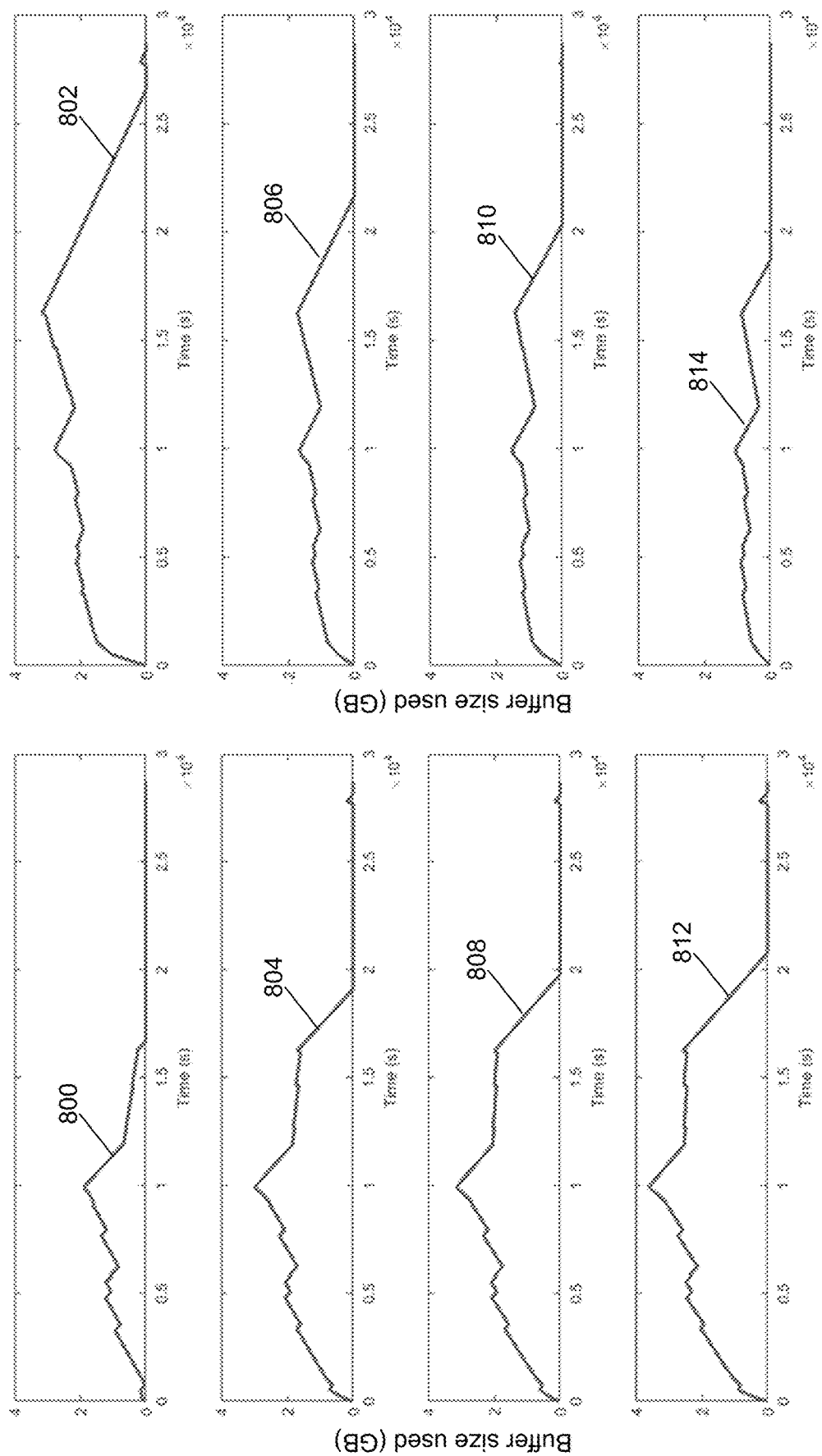
FIG. 8 depicts a buffer size usage history comparison between transmitters in accordance with an illustrative embodiment.

Referring to FIG. 8, a buffer usage history curve 800 shows the buffer usage as a function of time by the first transmitter using the initial allocation matrix, and a buffer usage history curve 802 shows the buffer usage as a function of time by the second transmitter using the initial allocation matrix. A buffer usage history curve 804 shows the buffer usage as a function of time by the first transmitter using the twentieth allocation matrix, and a buffer usage history curve 806 shows the buffer usage as a function of time by the second transmitter using the twentieth allocation matrix. A buffer usage history curve 808 shows the buffer usage as a function of time by the first transmitter using the fortieth allocation matrix, and a buffer usage history curve 810 shows the buffer usage as a function of time by the second transmitter using the fortieth allocation matrix. A buffer usage history curve 812 shows the buffer usage as a function of time by the first transmitter using the forty-fourth allocation matrix, and a buffer usage history curve 814 shows the buffer usage as a function of time by the second transmitter using the forty-fourth allocation matrix. The buffer usage between the first transmitter and the second transmitter is inversely correlated. As storage increases using the first transmitter, storage in the second transmitter decreases, which implies that the first transmitter would take longer to transmit all the stored data, meaning that the second transmitter would take less time to transmit all the stored data, and vice versa.

Referring again to FIG. 2, in an operation 214, a determination is made concerning whether there is another allocation to evaluate. When there is another allocation to evaluate, processing continues in an operation 216. When there is not another allocation to evaluate, processing continues in an operation 218. For example, a determination may be based on whether the entire range of values for each row of the initial allocation matrix has been processed in combination with the entire range of values for each other row of the initial allocation matrix.

In operation 216, the current allocation matrix is updated to define new values to evaluate using the allocation step size Δ, the iteration counter is incremented by one, and processing continues in operation 210 to simulate the transmission characteristics using the updated current allocation matrix. For example, allocation step size Δ is either added or subtracted from a current value included in a current row of the current allocation matrix for each transmitter such that a sum of the allocation adds to one. Once the range of values for the current row is processed, a next row is selected and the range of values for the next row is processed with each permutation of the previous rows, and so on that has not been processed. Each allocation matrix may be referred to as a permutation of allocation values between the data sources (one or more sensors through one or more data accumulators) and the transmitters of the simulated system. Each iteration of operation 216 creates a new permutation relative to a first permutation defined by the initial allocation matrix. A number of permutations may be defined based on a number of evaluations required to evaluate the entire range of values for each row of the allocation matrix based on the allocation step size Δ.

Figure 9A:
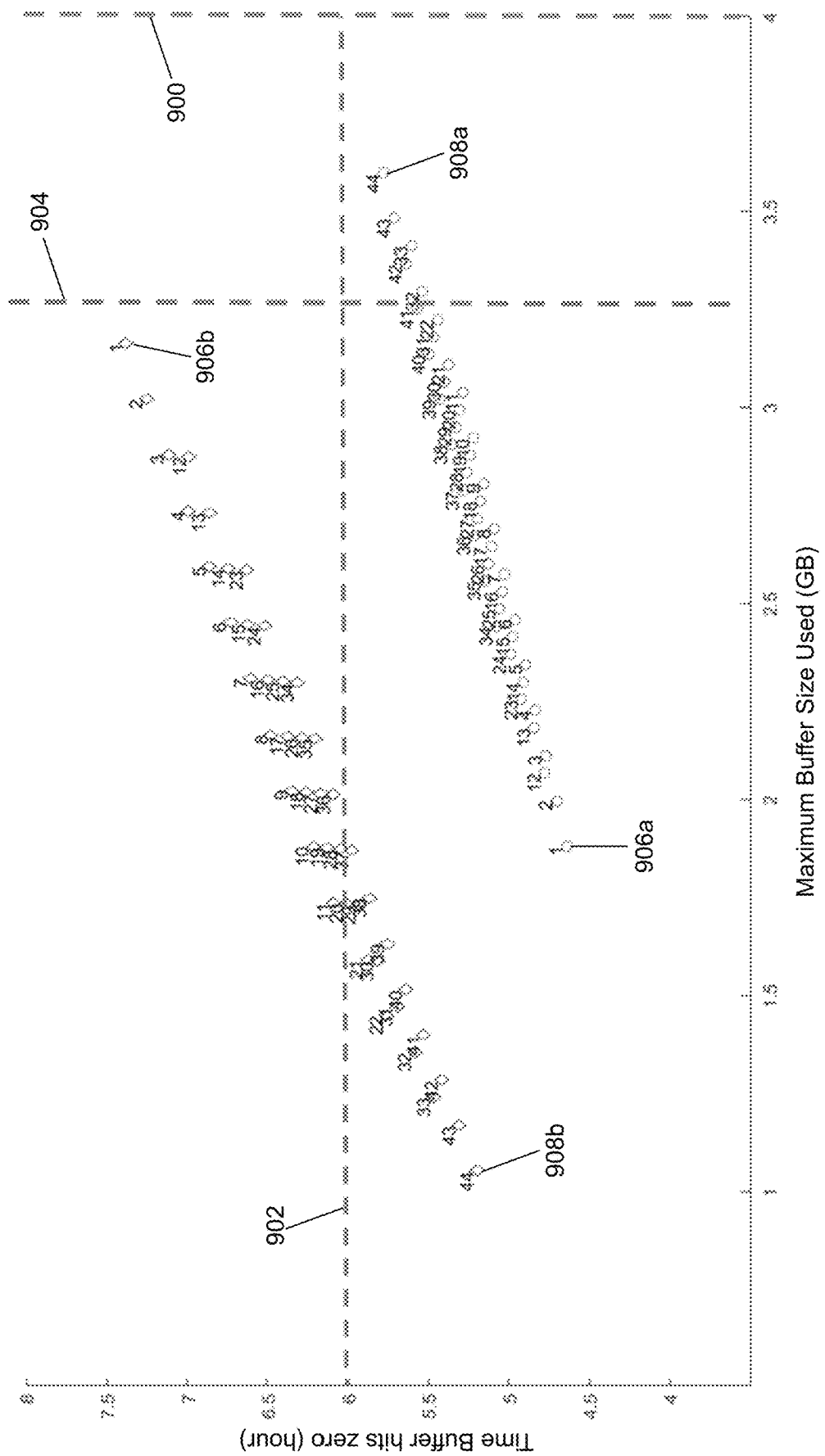
FIG. 9A depicts a buffer zero time as a function of a maximum buffer size used for each telemetry allocation and for each transmitter in accordance with an illustrative embodiment.

In operation 218, one or more graphs of the permutations as a function of the performance parameters may be presented to the user. For example, referring to FIG. 9A, a scatterplot of the buffer zero time value as a function of the maximum buffer size used is shown for each allocation matrix and for each transmitter. The iteration counter is shown in association with each allocation. For example, a first point 906a shows the buffer zero time value and the maximum buffer size used for the initial allocation matrix by the first transmitter, and a second point 908a shows the buffer zero time value and the maximum buffer size used for the last allocation matrix by the first transmitter. The intermediate permutations of the allocation matrix are shown having a zig zag pattern between first point 906a and second point 908a. A third point 906b shows the buffer zero time value and the maximum buffer size used for the initial allocation matrix by the second transmitter, and a fourth point 908b shows the buffer zero time value and the maximum buffer size used for the last allocation matrix by the second transmitter. The intermediate permutations of the allocation matrix are shown having a zig zag pattern between third point 906b and fourth point 908b. A maximum storage size is indicated by a line 900. A maximum buffer zero time value to maintain, in case communication is interrupted, is indicated by a line 902. A maximum buffer margin value to maintain, in case communication is interrupted, is indicated by a line 904. Again, there is an inverse relationship between the first transmitter and the second transmitter.

Figure 9B:
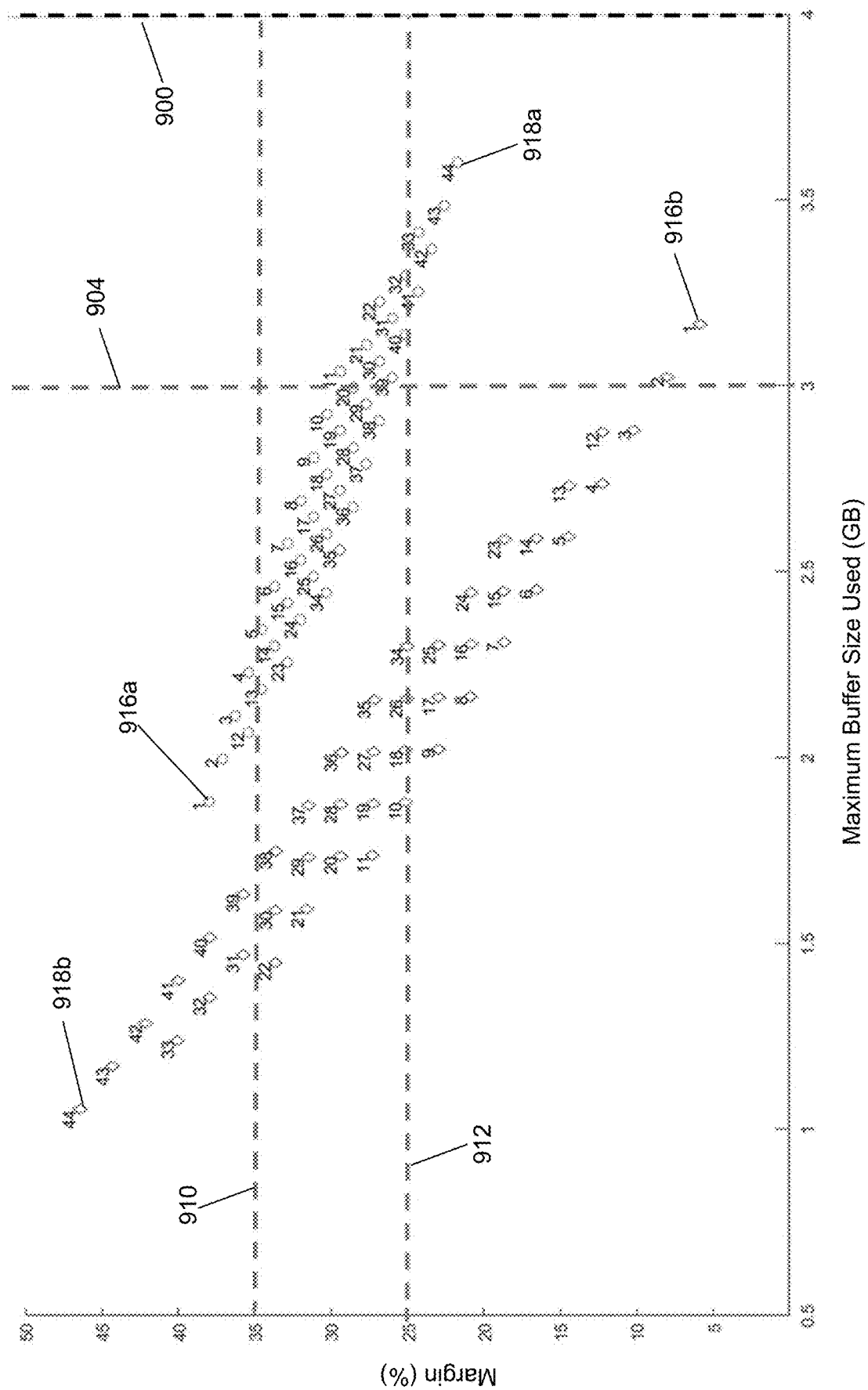
FIG. 9B depicts a margin as a function of a maximum buffer size used for each telemetry allocation and for each transmitter in accordance with an illustrative embodiment.

Referring to FIG. 9B, a scatterplot of the margin value as a function of the maximum buffer size used is shown for each allocation matrix index and for each transmitter. For example, a first point 916a shows the margin value and the maximum buffer size used for the initial allocation matrix by the first transmitter, and a second point 918a shows the margin value and the maximum buffer size used for the last allocation matrix by the first transmitter. The intermediate permutations of the allocation matrix are shown having a zig zag pattern between first point 916a and second point 918a. A third point 916b shows the margin value and the maximum buffer size used for the initial allocation matrix by the second transmitter, and a fourth point 918b shows the margin value and the maximum buffer size used for the last allocation matrix by the second transmitter. The intermediate permutations of the allocation matrix are shown having a zig zag pattern between third point 916b and fourth point 918b. A maximum margin value is indicated by a line 910, and a minimum margin value is indicated by a line 912 that together define thresholds for margin values. Again, there is an inverse relationship between the first transmitter and the second transmitter.

Referring again to FIG. 2, in an operation 220, a fifth indicator may be received that indicates ellipse definitions that describe boundaries for possible transmission allocations. A single ellipse definition may be received or an ellipse definition may be received for each transmitter of the plurality of transmitters, such as transmitter 1 310a and transmitter 2 310b of illustrative transmission system 300. For example, the fifth indicator indicates a center location and either a radius for a circle or a major value and a minor value for an ellipse. A location may be defined in a number of dimensions defined by the performance parameters used to select a transmission allocation. As an example, the fifth indicator may be received by telemetry allocation selection application 112 after selection from a user interface window or after entry by a user into a user interface window. In an alternative embodiment, the ellipse definitions may not be selectable. For example, a default ellipse definition may be accessed automatically by telemetry allocation selection application 112. For example, after reviewing the one or more graphs of the permutations as a function of the performance parameters, the user may define the ellipse definition for each two-dimensional graph.

In an operation 222, allocation permutations that fall within each circle or ellipse are determined. For example, a list of allocation permutations included in each respective circle or ellipse may be defined by determining whether a respective allocation permutation is within the area defined by the circle or ellipse, for example, using $$\frac{(x-x_c)^2}{r_x^2} + \frac{(y-y_c)^2}{r_y^2} \le 1,$$

where x is a first performance parameter value of the allocation such as the maximum buffer size used, y is a second performance parameter value of the allocation such as the buffer zero time value, $x_c$ is the ellipse center value in the dimension of the first performance parameter value, $y_c$ is the ellipse center value in the dimension of the second performance parameter value, $r_x$ is the ellipse radius value in the dimension of the first performance parameter value, and $rT_y$ is the ellipse radius value in the dimension of the second performance parameter value.

Figure 10A:
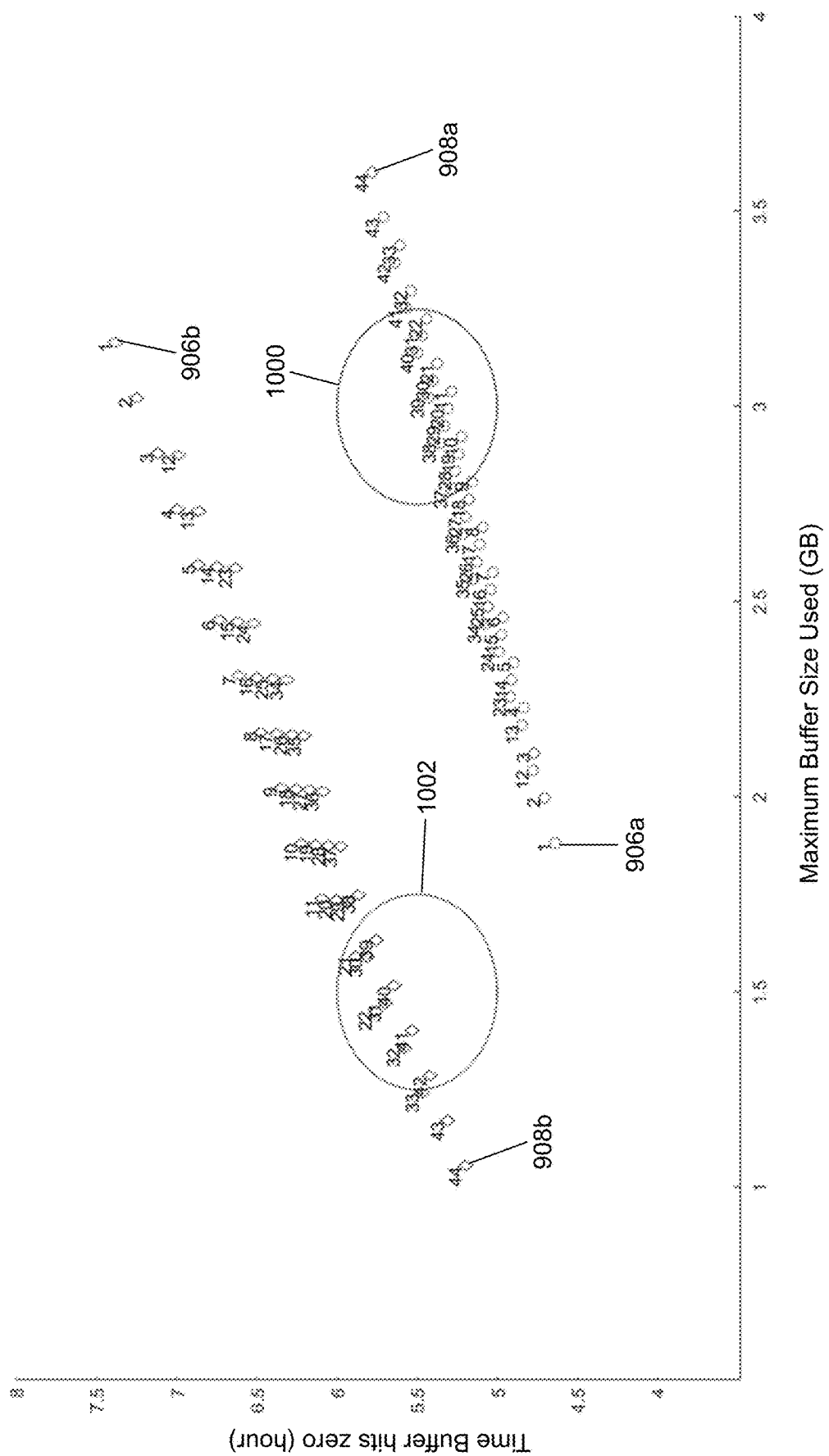
FIG. 10A depicts the buffer zero time as a function of the maximum buffer size used of FIG. 9A overlaid with selection ellipses in accordance with an illustrative embodiment.
Figure 10B:
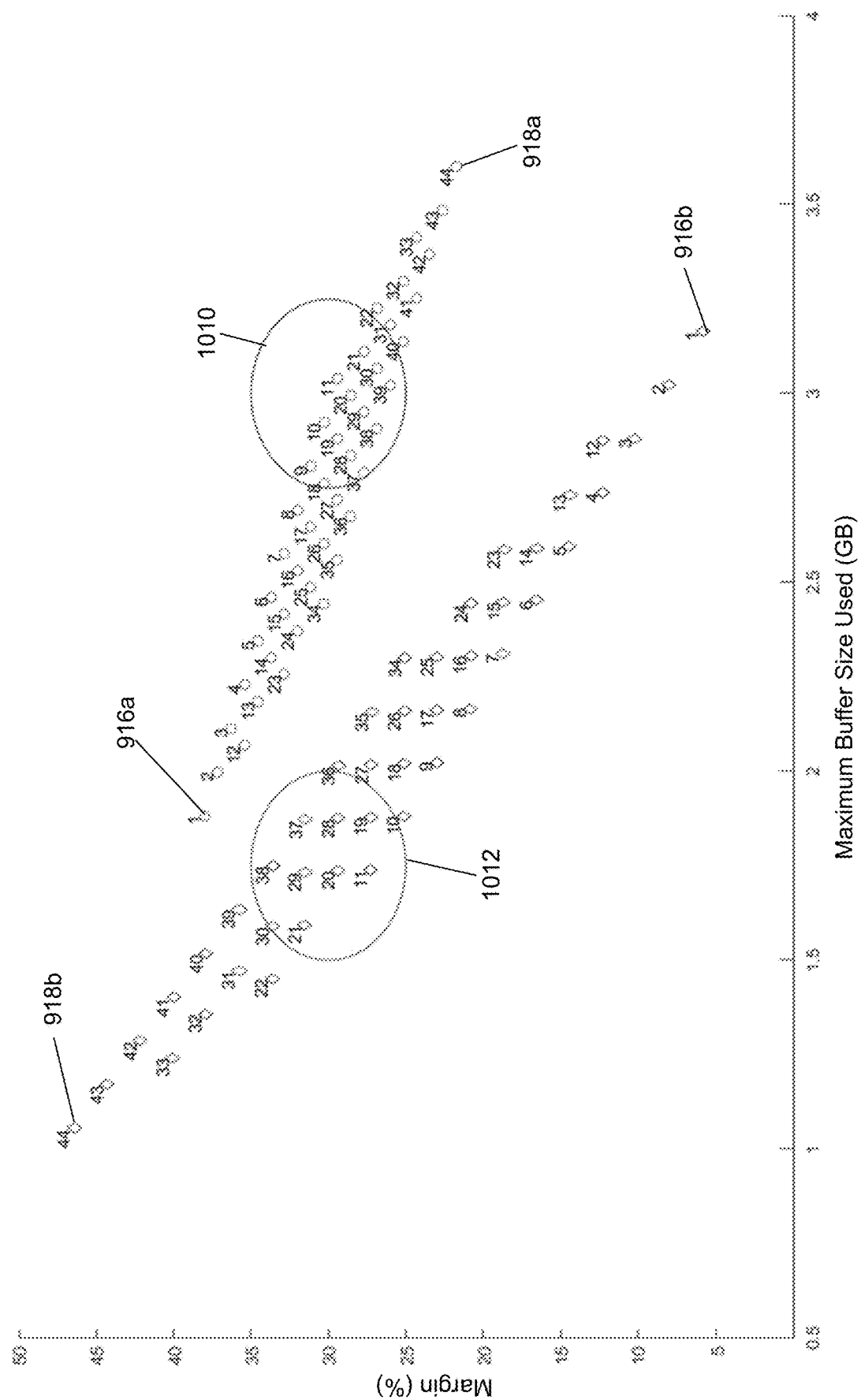
FIG. 10B depicts the margin as a function of the maximum buffer size used of FIG. 9B overlaid with selection ellipses in accordance with an illustrative embodiment.

For illustration, referring to FIG. 10A, a first ellipse 1000 is defined on a subset of the permutations of the allocation matrix between first point 906a and second point 908a for the first transmitter, and a second ellipse 1002 is defined on a subset of the permutations of the allocation matrix between third point 906b and fourth point 908b for the second transmitter. Because an ellipse may be defined for each pair of performance parameters, referring to FIG. 10B, a third ellipse 1010 is defined on a subset of the permutations of the allocation matrix between first point 916a and second point 918a for the first transmitter, and a fourth ellipse 1012 is defined on a subset of the permutations of the allocation matrix between third point 916b and fourth point 918b for the second transmitter. Additional ellipses may be defined for additional performance parameters.

Figure 10C:
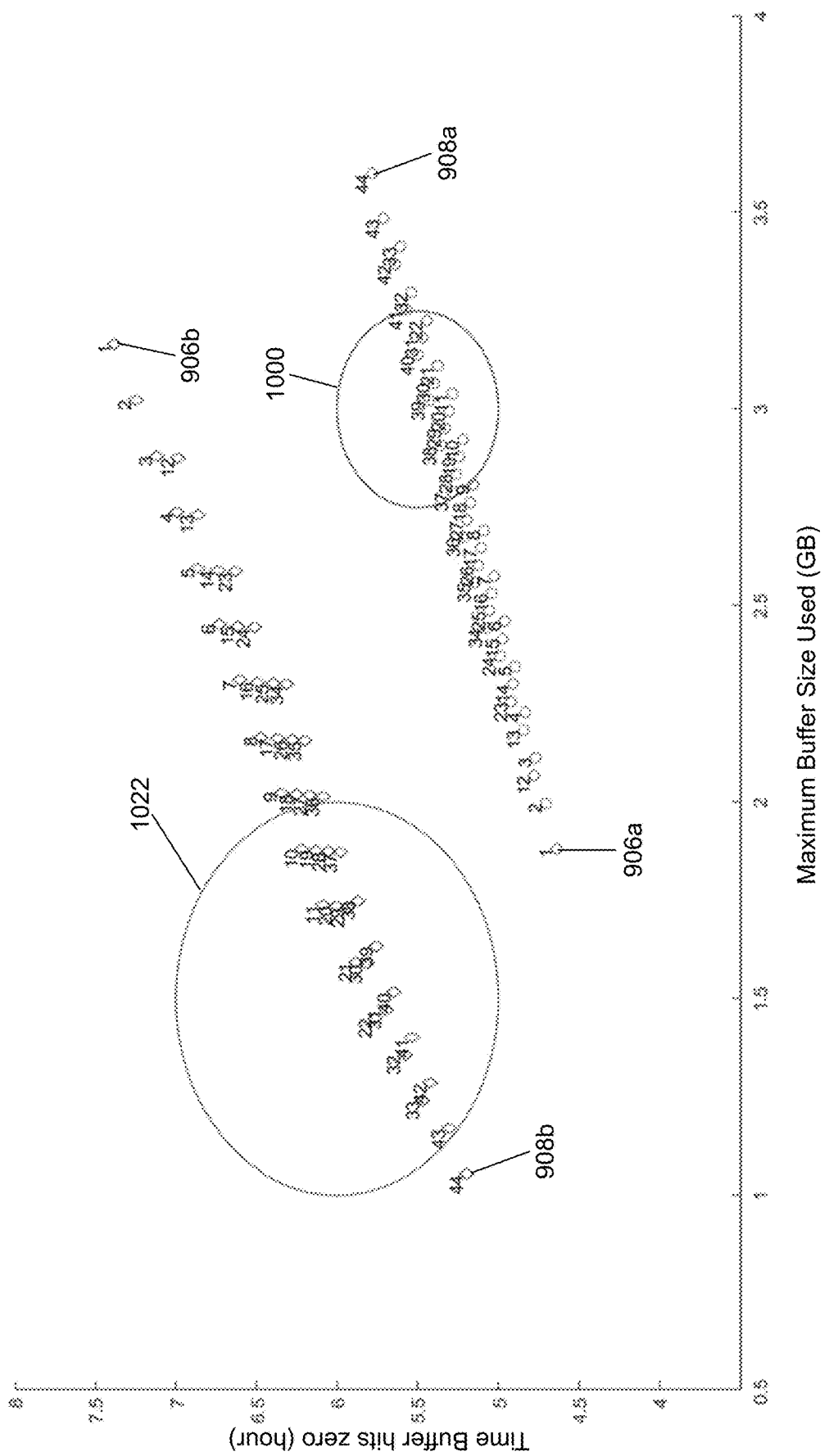
FIG. 10C depicts the buffer zero time as a function of the maximum buffer size used of FIG. 9A overlaid with second selection ellipses in accordance with an illustrative embodiment.

Referring to FIG. 10C, the ellipse definition may be different based on performance parameters and/or the transmitter. For example, a fifth ellipse 1022 is defined on a subset of the permutations of the allocation matrix between third point 906*b* and fourth point 908*b* for the second transmitter where fifth ellipse 1022 is larger than second ellipse 1002 that has the same size as first ellipse 1000.

Referring again to FIG. 2, in an operation 224, allocation permutations included in all of the circles or ellipses are determined. For example, a list of allocation permutations that are common to each ellipse is determined. The allocation permutations common to each ellipse may be evaluated using other criteria such as a complexity to further reduce the set of possible allocation permutations to implement. For example, a smaller value for the complexity may indicate that the implementation is simpler because fewer data source transmissions are split.

In an operation 226, the allocation permutations that are included in all of the circles or ellipses are output, for example, to telemetry allocation data 114. For example, the allocation matrix associated with a first allocation permutation of the allocation permutations determined to be included in all of the circles or ellipses may be output. The allocation matrix stored in telemetry allocation data 114 may be used subsequently to define the formats used during a data gathering mission. For example, the allocation matrix stored in telemetry allocation data 114 may be used to define the transmission of data by transmission system 300 during a portion of a rocket flight.

Telemetry allocation selection application 112 selects from various permutations for allocating data source transmissions among a plurality of transmitters. By selecting an allocation permutation, telemetry allocation selection application 112 improves a telemetry data collection process by more efficiently and effectively using the transmitters. Telemetry allocation selection application 112 can also be used as part of bandwidth and overhead analysis for various transmission systems.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that, when executed by a computing device, cause the computing device to:
   initialize an allocation matrix, wherein the allocation matrix defines a split ratio for data generated by a data source that is split between a plurality of transmitters, and wherein the split ratio is defined for each data source of a plurality of data sources;
   (A) execute a storage buffer model that simulates a buffer usage history as a function of time for each transmitter of the plurality of transmitters based on the allocation matrix, wherein a buffer is simulated to store data received from each data source of the plurality of data sources that exceeds a predefined download bandwidth value of a respective transmitter of the plurality of transmitters;
   (B) store a plurality of performance parameter values computed by the executed storage buffer model in association with the allocation matrix;
   (C) update the allocation matrix to redefine at least one split ratio of the split ratio defined for each data source of the plurality of data sources;
   (D) repeat (A) through (C) with the allocation matrix replaced with the updated allocation matrix until each unique permutation of values for the split ratio defined for each data source of the plurality of data sources is processed;
   (E) select an allocation matrix from allocation matrices stored in (B) based on the plurality of performance parameter values; and
   output the selected allocation matrix to define a telemetry allocation for a transmission of real data by the plurality of transmitters.

2. The non-transitory computer-readable medium of claim 1, wherein the data source includes one or more sensors.

3. The non-transitory computer-readable medium of claim 1, wherein the data source includes a plurality of sensors of a common sensor type.

4. The non-transitory computer-readable medium of claim 1, wherein the data includes sensor data and non-sensor data.

5. The non-transitory computer-readable medium of claim 1, wherein the split ratio has a value between zero and one inclusive.

6. The non-transitory computer-readable medium of claim 1, wherein the split ratio has a value of zero or one for at least one transmitter of the plurality of transmitters.

7. The non-transitory computer-readable medium of claim 1, wherein the split ratio has a value of zero or one for each transmitter of the plurality of transmitters.

8. The non-transitory computer-readable medium of claim 1, wherein the allocation matrix is updated using a predefined allocation step size to redefine the at least one split ratio in (C).

9. The non-transitory computer-readable medium of claim 1, wherein the split ratio defined for each transmitter of the plurality of transmitters sums to a value of one for each data source of the plurality of data sources.

10. The non-transitory computer-readable medium of claim 1, wherein the storage buffer model simulates a transmission history for each transmitter of the plurality of transmitters based on:
    the predefined download bandwidth value defined for each transmitter; and
    a predefined data generation by the plurality of data sources as a function of time.

11. The non-transitory computer-readable medium of claim 1, wherein a performance parameter value of the performance parameter values is selected from the group consisting of a maximum buffer size used value, a buffer zero time value, and a margin value.

12. The non-transitory computer-readable medium of claim 1, wherein before (E), the computer-readable instructions further cause the computing device to present, in a display, a graph of a pair of the performance parameter values.

13. The non-transitory computer-readable medium of claim 1, wherein before (E), the computer-readable instructions further cause the computing device to determine a list of allocation matrices that have performance parameter values that are within a boundary defined by a predefined ellipse that is defined based on a pair of the performance parameter values.

14. The non-transitory computer-readable medium of claim 13, wherein the predefined ellipse is a predefined circle.

15. The non-transitory computer-readable medium of claim 13, wherein the predefined ellipse is one of a plurality of predefined ellipses defined based on each unique pair of the performance parameter values, and wherein the list of allocation matrices includes second allocation matrices included in all of the plurality of predefined ellipses.

16. The non-transitory computer-readable medium of claim 13, wherein the allocation matrix selected in (E) is selected from the determined list of allocation matrices.

17. The non-transitory computer-readable medium of claim 13, wherein before (E), the computer-readable instructions further cause the computing device to reduce the determined list of allocation matrices to those having a minimum complexity value, and wherein a complexity value is determined for each allocation matrix of the determined list of allocation matrices based on a number of split ratio values of a respective allocation matrix that are greater than zero and less than one.

18. The non-transitory computer-readable medium of claim 17, wherein the allocation matrix selected in (E) is selected from the reduced list of allocation matrices.

19. A system comprising:
a processor; and
a computer-readable medium operably coupled to the processor, the computer-readable medium having computer-readable instructions stored thereon that, when executed by the processor, cause the system to
initialize an allocation matrix, wherein the allocation matrix defines a split ratio for data generated by a data source that is split between a plurality of transmitters, and wherein the split ratio is defined for each data source of a plurality of data sources;
(A) execute a storage buffer model that simulates a buffer usage history as a function of time for each transmitter of the plurality of transmitters based on the allocation matrix, wherein a buffer is simulated to store data received from each data source of the plurality of data sources that exceeds a predefined download bandwidth value of a respective transmitter of the plurality of transmitters;
(B) store a plurality of performance parameter values computed by the executed storage buffer model in association with the allocation matrix;
(C) update the allocation matrix to redefine at least one split ratio of the split ratio defined for each data source of the plurality of data sources;
(D) repeat (A) through (C) with the allocation matrix replaced with the updated allocation matrix until each unique permutation of values for the split ratio defined for each data source of the plurality of data sources is processed;
(E) select an allocation matrix from allocation matrices stored in (B) based on the plurality of performance parameter values; and
output the selected allocation matrix to define a telemetry allocation for a transmission of real data by the plurality of transmitters.

20. A method of selecting a telemetry allocation for the transmission of data from multiple transmitters, the method comprising:
initializing, by a computing device, an allocation matrix, wherein the allocation matrix defines a split ratio for data generated by a data source that is split between a plurality of transmitters, and wherein the split ratio is defined for each data source of a plurality of data sources;
(A) executing, by the computing device, a storage buffer model that simulates a buffer usage history as a function of time for each transmitter of the plurality of transmitters based on the allocation matrix, wherein a buffer is simulated to store data received from each data source of the plurality of data sources that exceeds a predefined download bandwidth value of a respective transmitter of the plurality of transmitters;
(B) storing, by the computing device, a plurality of performance parameter values computed by the executed storage buffer model in association with the allocation matrix;
(C) updating, by the computing device, the allocation matrix to redefine at least one split ratio of the split ratio defined for each data source of the plurality of data sources;
(D) repeating, by the computing device, (A) through (C) with the allocation matrix replaced with the updated allocation matrix until each unique permutation of values for the split ratio defined for each data source of the plurality of data sources is processed;
(E) selecting, by the computing device, an allocation matrix from allocation matrices stored in (B) based on the plurality of performance parameter values; and
outputting, by the computing device, the selected allocation matrix to define a telemetry allocation for a transmission of real data by the plurality of transmitters.

* * * * *